United States Patent
Li et al.

(10) Patent No.: US 6,237,421 B1
(45) Date of Patent: May 29, 2001

(54) APPARATUS FOR MEASURING A CHARACTERISTIC OF AN OBJECT USING AN OPTICAL FIBER AND LIGHT PULSES

(75) Inventors: Xin zen Li; Shiro Takada; Masayuki Miyazaki, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/335,265

(22) Filed: Jun. 17, 1999

(30) Foreign Application Priority Data

Jun. 19, 1998 (JP) .................................................. 10-173688
Jun. 19, 1998 (JP) .................................................. 10-173690
May 28, 1999 (JP) .................................................. 11-150618

(51) Int. Cl.[7] ...................................................... G01L 1/24
(52) U.S. Cl. .............................................................. 73/800
(58) Field of Search ............................... 73/763, 766, 800

(56) References Cited

U.S. PATENT DOCUMENTS

| | | | |
|---|---|---|---|
| 4,409,476 | * 10/1983 | Lofgren et al. | 250/227.23 |
| 4,448,547 | * 5/1984 | Wickersheim | 374/131 |
| 5,182,449 | * 1/1993 | Johnson et al. | 250/227.14 |
| 5,228,893 | * 7/1993 | Smithgall et al. | 65/377 |
| 5,257,088 | * 10/1993 | Tyson, II et al. | 356/353 |
| 5,304,809 | * 4/1994 | Wickersheim | 250/458.1 |

FOREIGN PATENT DOCUMENTS 3120437  5/1991  (JP) .

* cited by examiner

*Primary Examiner*—Max Noori
(74) *Attorney, Agent, or Firm*—Leydig, Voit & Mayer, Ltd.

(57) ABSTRACT

A light intensity measurement unit can sample the light intensity of scattered light at time intervals of a certain length corresponding to two times the length of each of small equal length sections, into which a measurement area in an optical fiber is divided. A computation unit can then compute the strain and/or temperature of each of the small sections of the measurement area in the optical fiber, based on the light intensity of the scattered light measured by the light intensity measurement unit from the scattering gain coefficient of the scattered light associated with each of the small sections.

17 Claims, 19 Drawing Sheets

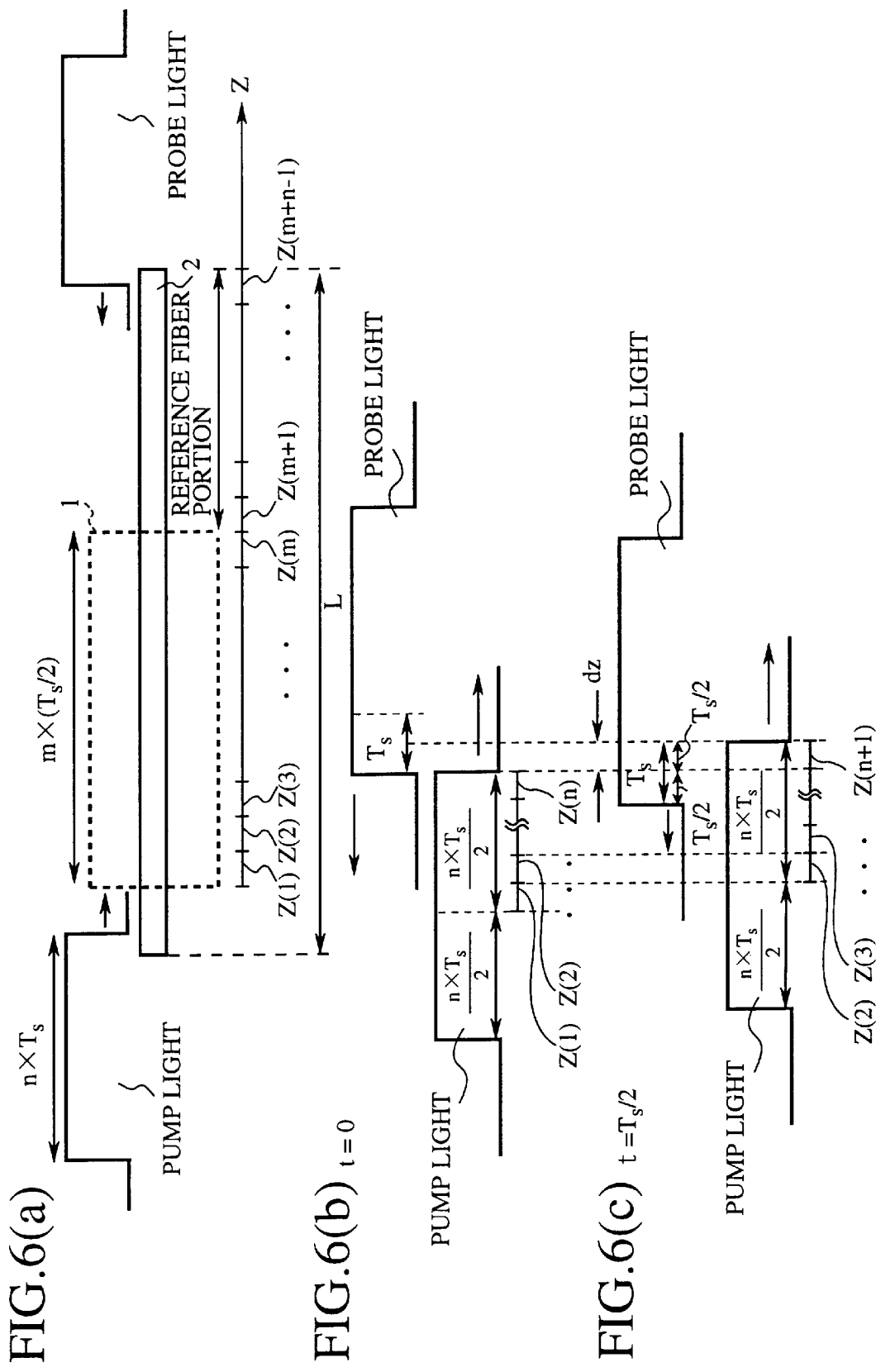

INCIDENT PUMP LIGHT

PUMP LIGHT THAT HAS PROPAGATED THROUGH THE OPTICAL FIBER

TIME DURATION OF PROBE LIGHT

CODE: 1111111111 ---------- 11111111

CODE: 1010101010 ---------- 10101010

Tp

2Tp

CODE: 0101010101 ---------- 01010101

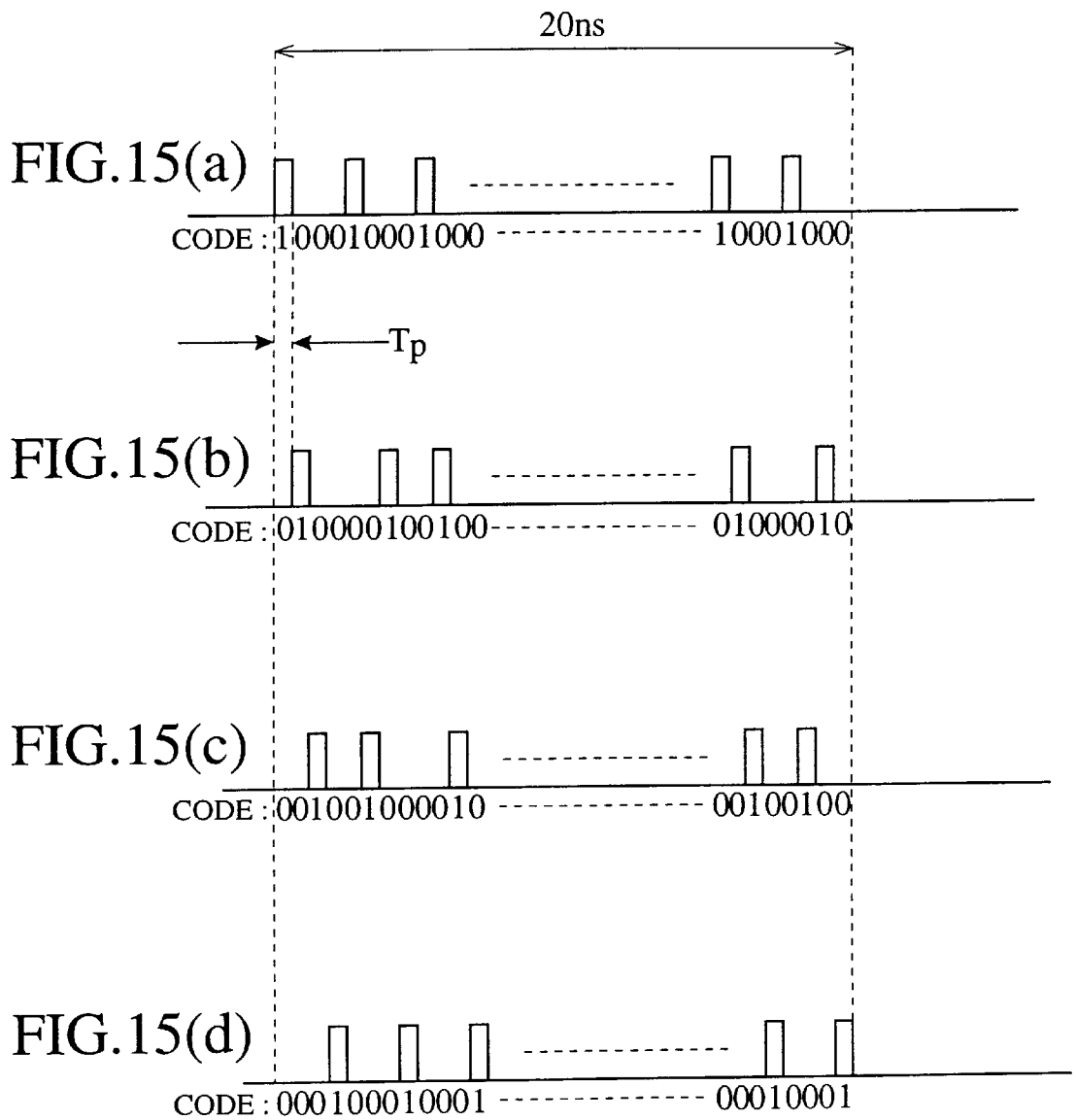

APPARATUS FOR MEASURING A CHARACTERISTIC OF AN OBJECT USING AN OPTICAL FIBER AND LIGHT PULSES

BACKGROUND OF THE INVENTION

1. Field of the Invention

The present invention relates to a measurement device for measuring the strain that appears in an object to be measured, such as a structure, and/or temperature of the object, by using an optical fiber. More particularly, it relates to an improvement in a measurement of the strain that appears in an object to be measured and/or the temperature of the object, which makes it possible to measure them with a very high spatial resolution.

2. Description of the Prior Art

Referring now to FIG. 25, there is illustrated a block diagram showing the structure of a prior art measurement device for measuring the strain that appears in an object to be measured and/or temperature of the object to be measured, by means of an optical fiber, by using a technique as disclosed in Japanese Patent Application Publication (KOKAI) No. 3-120437, for example. In the figure, reference numeral 1 denotes an object to be measured, 2 denotes an optical fiber, 3 denotes a pump light source for emitting and injecting discontinuous pump light into an end (first end) of the optical fiber 2, 4 denotes a probe light source for emitting and injecting continuous probe light into another end (second end) of the optical fiber 2, 5 denotes a light intensity measurement unit (or light detector) for sampling the light intensity output light emitted from the first end of the optical fiber 2 and for furnishing light intensity data, 6 denotes a multiplexer/branching coupler for causing the output light from the optical fiber 2 to branch to the light intensity measurement unit 5, 7 denotes a filter located between the multiplexer/branching coupler 6 and the light intensity measurement unit 5, for transmitting Brillouin scattered light included in the output light, and 8 denotes a computation unit for computing the strain that appears in a predetermined zone defined in the optical fiber 2, or the temperature of the predetermined zone, based on the light intensity data from the light intensity measurement unit 5.

In operation, the pump light source 3 injects discontinuous pump light with a certain frequency into the first end of the optical fiber 2 first while the probe light source 4 injects continuous probe light into the second end of the optical fiber 2. While the discontinuous pump light travels through the optical fiber 2, the discontinuous pump light and the continuous probe light overlap one another at a certain position of the optical fiber 2. If the frequency of the probe light agrees with any one of the frequencies of scattered light lines, such as Brillouin scattered light lines, caused by the pump light, the scattered light is amplified enough to be easily detected. The multiplexer/branching coupler 6 causes output light emitted from the first end of the optical fiber 2 to branch to the filter 7. The filter 7 then transmits only the amplified probe light, which will be referred to as Brillouin scattered light, included in the output light from the multiplexer/branching coupler6. The light intensity measurement unit 5 samples the light intensity of the Brillouin scattered light.

Such a process of measuring the Brillouin scattered light is repeated with different frequencies of the continuous probe light, and the computation unit 8 then receives and stores intensity data of the measured light intensities of the sampled Brillouin scattered light associated with a predetermined zone defined in the optical fiber 2, which lies within a certain band of frequencies corresponding to the range in which the frequency of the probe light has been scanned. Thus the computation unit 8 can get a spectrum of the Brillouin scattered light associated with the predetermined zone. The computation unit 8 then determines the frequency of the sampled Brillouin scattered light with the largest light intensity as a center frequency of the Brillouin scattered light associated with the predetermined zone defined in the optical fiber, and computes a frequency shift in the center frequency computed from a reference center frequency that was measured for the optical fiber 2 with no strain. The computation unit 8 thus can compute the strain that appears in the predetermined zone defined in the optical fiber based on the frequency shift computed.

A problem with the prior art measurement device constructed as above is that it cannot measure the strain that appears in an object to be measured or temperature of the object to be measured with a fine (or high) spatial resolution. To be more specific, since an optical fiber having high transparency to light with a wavelength of about 1.5 $\mu$m is generally used, Brillouin scattered light is generated with a bandwidth of about 50 MHz when such light with a high intensity is incident on the optical fiber. As a result, even if discontinuous pump light with a time duration less than 20 nsec is injected into the optical fiber under the circumstances, Brillouin scattered light is generated with a bandwidth of about 50 MHz. In other words, Brillouin scattered light has been widened over a time period of 20 nsec. Accordingly, pump light with a time duration less than 20 nsec will generate scattered light similar to that generated by pump light with a time duration of 20 nsec, and therefore the prior art measurement device can only achieve a spatial resolution around the length (=about 2 m=2×10$^8$ m/s×10× 10$^{-9}$, assuming that the speed of light is 2×10$^8$ m/s), which is determined by the duration of the discontinuous pump light.

SUMMARY OF THE INVENTION

The present invention is made to overcome the problem mentioned above. It is therefore an object of the present invention to provide a measurement device capable of measuring the strain that appears in an object to be measured and/or temperature of the object to be measured with a very high spatial resolution.

In accordance with one aspect of the present invention, there is provided a measurement device for measuring the strain and/or temperature of an object to be measured, the device comprising: an optical fiber secured to the object to be measured; a pump light source for injecting discontinuous pump light into the optical fiber; a probe light source for injecting discontinuous probe light into the optical fiber; a control unit for setting the frequency of the discontinuous probe light and for scanning the frequency of the discontinuous probe light over a predetermined range of frequencies; a light intensity measurement unit for measuring a light intensity of output light emitted out of the optical fiber; a filter located on the path from the optical fiber to the light intensity measurement unit, for transmitting scattered light included in the output light; and a computation unit for computing the strain and/or temperature of a predetermined zone within a measurement area defined in the object to be measured.

In accordance with a preferred embodiment of the present invention, the light intensity measurement unit samples the light intensity of the scattered light at predetermined time intervals. Each of the time intervals has a certain length corresponding to two times the length of each of a plurality of small equal sections in the measurement area defined in the optical fiber. The computation unit then computes the strain and/or temperature of each of the plurality of small sections of the measurement area defined in the optical fiber, based on the light intensity of the scattered light measured by the light intensity measurement unit.

In accordance with another preferred embodiment of the present invention, the measurement area defined in the optical fiber is divided into m small equal sections, the pump light source injects discontinuous pump light with a time duration or width equal to n-times the length of each of the predetermined intervals, which corresponds to two times the length of each of the plurality of small sections, into the optical fiber, and the computation unit computes the scattering gain coefficient of scattered light associated with each of the plurality of small sections based on the light intensity of scattered light of a frequency equal to the set frequency vs of the discontinuous probe light, the light intensity of the scattered light being sampled at the predetermined intervals by the light intensity measurement unit, according to the following equation (1), $$\begin{pmatrix} a(1,1) & a(1,2) & \cdots & a(1,n) & 0 & \cdots & \cdots & \cdots & \cdots & 0 \\ 0 & a(2,2) & a(2,3) & \cdots & a(2,n+1) & 0 & \cdots & \cdots & \cdots & 0 \\ \vdots & & \ddots & & & & & & & \vdots \\ 0 & \cdots & \cdots & a(i,i) & a(i,i+1) & \cdots & a(i,i+n-1) & 0 & \cdots & 0 \\ \vdots & & & & \ddots & & & & & \vdots \\ 0 & \cdots & \cdots & \cdots & a(m,m) & a(m,m+1) & \cdots & \cdots & \cdots & a(m,m+n-1) \end{pmatrix} \begin{pmatrix} gs(1) \\ gs(2) \\ \vdots \\ gs(i) \\ \vdots \\ gs(m) \\ \vdots \\ gs(m+n-1) \end{pmatrix} = \begin{pmatrix} Qs(1) \\ Qs(2) \\ \vdots \\ Qs(i) \\ \vdots \\ Qs(m) \end{pmatrix} \quad (1)$$

where Qs(i) (i=1, ..., m) is a variable determined by for example the light intensity of scattered light associated with the i-th to (i+n−1)-th small sections numbered (or counted) from the one at one end of the measurement area, and the light intensity of the discontinuous probe light incident on the optical fiber, gs(i) is the scattering gain coefficient of scattered light of a frequency equal to the set frequency vs, which is associated with the i-th small section, and a(i,) is a contribution factor representing a ratio of the light intensity of scattered light associated with the j-th small section to Qs(i). The computation unit then computes a frequency shift in the scattered light associated with each of the plurality of small sections based on scattering gain coefficients computed throughout the predetermined frequency range of the discontinuous probe light, over which the set frequency vs of the discontinuous probe light has been scanned. Thus it is possible to compute the strain that appears in each of the plurality of small sections and/or temperature of each of the plurality of small sections based on the frequency shift computed, and/or light intensities of the scattered light associated with each of the plurality of small sections which have been obtained by scanning the set frequency vs of the discontinuous probe light.

In accordance with another preferred embodiment of the present invention, the pump light source injects discontinuous pump light into one end of the optical fiber, the probe light source injects discontinuous probe light into another end of the optical fiber, the light intensity measurement unit measures a light intensity of output light emitted out of the first end of the optical fiber, and the computation unit computes the variable Qs(i) in consideration of an attenuation of the discontinuous probe light in the optical fiber according to the following equation (2):

$$Qs(i) = \ln\left\{\frac{Ps(t,0)}{Ps\left(t-\frac{L}{C},L\right)}\right\} + \alpha_s L \quad (2)$$

where Ps(t,0) is the light intensity of scattered light at the end of the optical fiber measured at time t by the light intensity measurement unit, Ps(t−L/c,L) is the light intensity of the discontinuous probe light at the other end of the optical fiber measured at time (t−L/c), αs is an attenuation coefficient of the discontinuous probe light, L is the length of the optical fiber, and c is the light speed of the discontinuous probe light in the optical fiber.

In accordance with another preferred embodiment of the present invention, the measurement device further comprises a temperature measurement unit for measuring a temperature of a reference fiber portion, associated with the scattering gain coefficients gs(m+1) to gs(M+n−1) (or gs(1) to gs(n−1)), which is a part of the optical fiber not secured to the object to be measured. The computation unit then computes the scattering gain coefficients gs(m+1) to gs(M+n−1) based on the temperature measured and then computes the scattering gain coefficient associated with each of the plurality of small sections, according to the equation (1).

In accordance with another preferred embodiment of the present invention, the computation unit computes the contribution factor a(i,j) for each of the plurality of small sections according to the following equation (3):

$$a(i,j) = \frac{Pk(0)}{A} e^{-\alpha_p z} \cdot dz \quad (3)$$

where, assuming that the discontinuous pump light is divided into n equal parts, Pk(0) is the light intensity of the k-th small pump light part Pk numbered from the end of the pump light when it is incident on one end of the optical fiber, A is the cross-sectional area of the optical fiber core, $\alpha_p$ is an attenuation coefficient of the discontinuous pump light, z is the distance from the end of the optical fiber on which the discontinuous pump light is incident to a specified small section, and dz is the length of each of the plurality of small sections.

In accordance with another preferred embodiment of the present invention, the computation unit computes a strain change $\Delta\epsilon$ that appears in each of the plurality of small sections, and the temperature $\Delta T$ of each of the plurality of small sections, according to the following equation (4):

$$\begin{pmatrix} \Delta v \\ \frac{\Delta Ps}{P_{(R)}} \end{pmatrix} = \begin{pmatrix} C_{\varepsilon v} & C_{Tv} \\ C_{\varepsilon P} & C_{TP} \end{pmatrix} \begin{pmatrix} \Delta \varepsilon \\ \Delta T \end{pmatrix} \quad (4)$$

where $\Delta v$ is the frequency shift, $\Delta Ps$ is a power shift in the light intensity of the scattered light measured or a variation in the scattering gain coefficient computed, $P(R)$ is a light intensity of Rayleigh scattered light or the light intensity of the discontinuous pump light, $C_{\varepsilon v}$, $C_{\varepsilon p}$, $C_{Tv}$, and $C_{tp}$ are constants of the optical fiber.

In accordance with another preferred embodiment of the present invention, the measurement device further comprises a reflection member disposed at one end of the optical fiber. The pump light source injects discontinuous pump light into another end of the optical fiber, the probe light source injects discontinuous probe light into the same end of the optical fiber as the pump light is injected, the light intensity measurement unit measures a light intensity of output light emitted out of the same end of the optical fiber.

In accordance with another preferred embodiment of the present invention, the optical fiber is partially secured to one or more objects to be measured.

In accordance with another aspect of the present invention, there is provided a measurement device for measuring the strain and/or temperature of an object to be measured, the device comprising: an optical fiber secured to the object to be measured, the optical fiber including a measurement area divided into m small equal sections each having a certain length; a pump light source for injecting discontinuous pump light into the optical fiber; a probe light source for injecting discontinuous probe light into the optical fiber; a control unit for setting the frequency of the discontinuous probe light to a certain frequency vs and for scanning the set frequency vs of the discontinuous probe light over a predetermined range of frequencies; a light intensity measurement unit for measuring a light intensity of output light emitted out of the optical fiber; a filter located on the path from the optical fiber to the light intensity measurement unit, for transmitting scattered light included in the output light; a computation unit for computing a distribution of strain that appears in the measurement area defined in the optical fiber and/or a distribution of temperature of the measurement area; the pump light source injecting discontinuous pump light with a time duration or width equal to n-times the length of a predetermined time period, which corresponds to two times the length of each of the plurality of small sections, into the optical fiber with respect to each discontinuous probe light incident on the optical fiber, under control of the control unit; the probe light source successively injecting at least two series of discontinuous probe light each comprised of a series of light pulses, which can be obtained by dividing discontinuous light with a certain time duration or width in units of the predetermined period, under control of the control unit, so that each of them collides with corresponding discontinuous pump light from the pump light source at a certain position in the optical fiber; the computation unit computing the scattering gain coefficient of scattered light associated with each of the plurality of small sections based on the light intensity of scattered light of a frequency equal to the set frequency vs of the discontinuous probe light, which has been measured by the light intensity measurement unit, according to the above-mentioned equation (1). The computation unit then computes a frequency shift in the scattered light associated with each of the plurality of small sections based on scattering gain coefficients computed throughout the predetermined frequency range of the discontinuous probe light, over which the set frequency vs of the discontinuous probe light has been scanned, so as to compute the strain and/or temperature of each of the plurality of small sections based on the frequency shift computed, and/or light intensities of the scattered light associated with each of the plurality of small sections which have been obtained by scanning the set frequency vs of the discontinuous probe light.

In accordance with another preferred embodiment of the present invention, the plurality of light pulses included in each discontinuous probe light have a constant pulse repetition rate.

In accordance with another preferred embodiment of the present invention, the plurality of light pulses included in each discontinuous probe light are a series of pulses that does not have necessarily a constant pulse repetition rate and that corresponds to a certain code.

In accordance with another preferred embodiment of the present invention, the pump light source injects discontinuous pump light into one end of the optical fiber, the probe light source injects discontinuous probe light into another end of the optical fiber, the light intensity measurement unit measures a light intensity of output light emitted out of the end of the optical fiber, and the computation unit computes the variable $Qs(i)$ in consideration of an attenuation of the discontinuous probe light in the optical fiber according to the above-mentioned equation (2).

In accordance with another preferred embodiment of the present invention, the measurement device further comprises a temperature measurement unit for measuring the temperature of a reference fiber portion, associated with the scattering gain coefficients $gs(m+1)$ to $gs(M+n-1)$ (or $gs(1)$ to $gs(n-1)$), which is a part of the optical fiber not secured to the object to be measured. The computation unit then computes the scattering gain coefficients $gs(m+1)$ to $gs(M+n-1)$ based on the temperature measured and then computes the scattering gain coefficient associated with each of the plurality of small sections, according to the above-mentioned equation (1).

In accordance with another preferred embodiment of the present invention, the computation unit computes the contribution factor $a(i,j)$ for each of the plurality of small sections according to the above-mentioned equation (3).

In accordance with another preferred embodiment of the present invention, the computation unit computes a strain change $\Delta \varepsilon$ that appears in each of the plurality of small sections, and the temperature $\Delta T$ of each of the plurality of small sections, according to the above-mentioned equation (4).

In accordance with another preferred embodiment of the present invention, the measurement device further comprises a reflection member disposed at one end of the optical fiber. The pump light source injects discontinuous pump light into another end of the optical fiber, the probe light source injects discontinuous probe light into the same end of the optical fiber as the pump light is injected, and the light intensity measurement unit measures a light intensity of output light emitted out of the same end of the optical fiber.

In accordance with another preferred embodiment of the present invention, the optical fiber is partially secured to one or more objects to be measured.

In accordance with another aspect of the present invention, there is provided a measurement device for measuring the strain and/or temperature of an object to be measured, the device comprising: an optical fiber secured to the object to be measured, the optical fiber including a measurement area divided into m small equal sections each having a certain length; a pump light source for injecting discontinuous pump light into the optical fiber; a probe light source for injecting discontinuous probe light into the optical fiber; a control unit for setting the frequency of the discontinuous probe light to a certain frequency vs and for scanning the set frequency vs of the discontinuous probe light over a predetermined range of frequencies; a light intensity measurement unit for measuring a light intensity of output light emitted out of the optical fiber; a filter located on the path from the optical fiber to the light intensity measurement unit, for transmitting scattered light included in the output light; a computation unit for computing a distribution of strain that appears in the measurement area defined in the optical fiber and/or a distribution of temperature of the measurement area; the pump light source injecting discontinuous pump light with a time duration or width equal to n-times the length of a predetermined time period, which corresponds to two times the length of each of the plurality of small sections, into the optical fiber with respect to each discontinuous probe light incident on the optical fiber, under control of the control unit; the probe light source injects either discontinuous probe light with the set frequency vs, which is comprised of a series of light pulses having a predetermined pulse repetition period equal to the predetermined time period, or at least two series of discontinuous probe light with the frequency vs in succession, each of which is comprised of a series of light pulses which can be obtained by dividing the discontinuous probe light, under control of the control unit, so that each discontinuous probe light collides with corresponding discontinuous pump light from the pump light source at a certain position in the optical fiber; the computation unit computing the scattering gain coefficient of scattered light associated with each of the plurality of small sections based on the light intensity of scattered light of a frequency equal to the set frequency vs of the discontinuous probe light, which has been measured by the light intensity measurement unit, according to the above-mentioned equation (1). The computation unit then computes a frequency shift in the scattered light associated with each of the plurality of small sections based on scattering gain coefficients computed throughout the predetermined frequency range of the discontinuous probe light, over which the set frequency vs of the discontinuous probe light has been scanned, so as to compute the strain and/or temperature of each of the plurality of small sections based on the frequency shift computed, and/or light intensities of the scattered light associated with each of the plurality of small sections which have been obtained by scanning the set frequency vs of the discontinuous probe light.

In accordance with another preferred embodiment of the present invention, the plurality of light pulses included in each discontinuous probe light are a series of pulses that does not have necessarily a constant pulse repetition rate and that corresponds to a certain code.

Further objects and advantages of the present invention will be apparent from the following description of the preferred embodiments of the invention as illustrated in the accompanying drawings.

BRIEF DESCRIPTION OF THE DRAWINGS

FIG. 6(a) is a diagram showing a plurality of small sections defined in a measurement area defined in an optical fiber, according to second embodiment of the present invention;

FIGS. 6(b) and 6(c) are diagrams exemplarily showing the configuration of a plurality of small sections and the length of each of them;

FIGS. 15(a) to 15(d) are diagrams each showing the waveform of each discontinuous probe light for use with a measurement device according to a fourth embodiment of the present invention;

DETAILED DESCRIPTION OF THE PREFERRED EMBODIMENTS

First Embodiment

Figure 1:
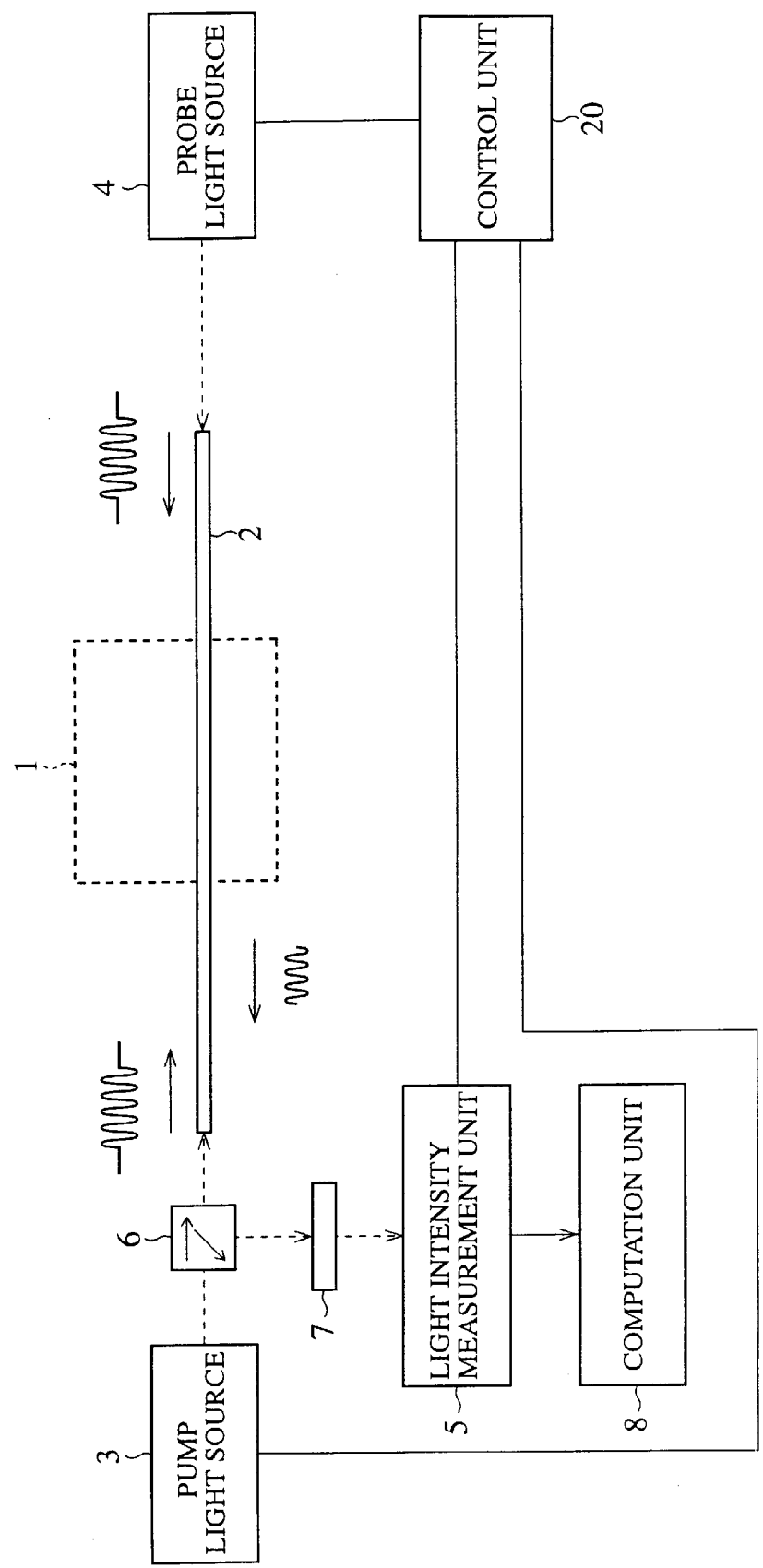
FIG. 1 is a block diagram showing the structure of a measurement device according to a first embodiment of the present invention.

Referring next to FIG. 1, there is illustrated a block diagram showing the structure of a measurement device according to a first embodiment of the present invention. In the figure, reference numeral 1 denotes a structure (i.e., an object to be measured) such as a bridge, a covered road, or a building, 2 denotes an optical fiber secured to the structure 1, 3 denotes a pump light source for emitting and injecting discontinuous pump light into an end (first end) of the optical fiber 2, 4 denotes a probe light source for emitting and injecting discontinuous probe light into another end (second end) of the optical fiber 2, 5 denotes a light intensity measurement unit for sampling the light intensity of output light emitted out of the first end of the optical fiber 2 and for furnishing light intensity data, 6 denotes a multiplexer/branching coupler for causing the output light from the optical fiber 2 to branch to the light intensity measurement unit 5, 7 denotes a filter located between the multiplexer/branching coupler 6 and the light intensity measurement unit 5, for transmitting Brillouin scattered light included in the output light, 8 denotes an computation unit for computing the strain that appears in a predetermined zone of the optical fiber 2, and/or temperature of the predetermined zone, based on the intensity data from the light intensity measurement unit 5, and 20 denotes a control unit for setting the frequency of the discontinuous probe light to a certain frequency vs which falls within a predetermined range of frequencies and scanning the certain frequency over the predetermined frequency range, and for controlling the pump light source 3 and the probe light source 4 so that the discontinuous probe light and the discontinuous pump light collide with each other at a predetermined zone, that is, they overlap each other at the predetermined zone. The optical fiber 2 can be partially built in the structure 1 or fixed to the surface of the structure 1.

In the first embodiment of the present invention, a light pulse with a time duration of 20 nsec (i.e., a pulse width of 20 nsec) and power of 100 mW can be used as the discontinuous pump light, and a light pulse with a time duration of 20 nsec and power of 3 mW can be used as the discontinuous probe light.

Next, a description will be made as to the operation of the measurement device of the first embodiment, in the case where it is used to measure the strain that appears in a predetermined zone of the structure 1 using Brillouin scattered light when variations in the temperature of the structure 1 can be ignored.

In accordance with the first embodiment, the predetermined zone can be defined as a section where the head of the discontinuous probe light travels during an interval between an instant at which the head of the discontinuous probe light collides with the head of the discontinuous pump light and an instant at which the head of discontinuous probe light and the end of the discontinuous pump light pass each other. As an alternative, the predetermined zone can be defined as a section where another specified portion, such as the center, of the discontinuous probe light travels during an interval between an instant at which the other specified portion of the discontinuous probe light collides with the head of the discontinuous pump light and an instant at which the other specified portion of the discontinuous probe light and the end of the discontinuous pump light pass each other. In either case, the length of the predetermined zone is equal to a distance traveled by the probe light during an interval corresponding to half of the pulse width of the discontinuous pump light, i.e., 10 nsec, in this case, and is equal to about 2 m (=$2 \times 10^8$ m/sec$\times 10 \times 10^{-9}$, assuming that the light speed is about $2 \times 10^8$ m/sec).

Figure 2:
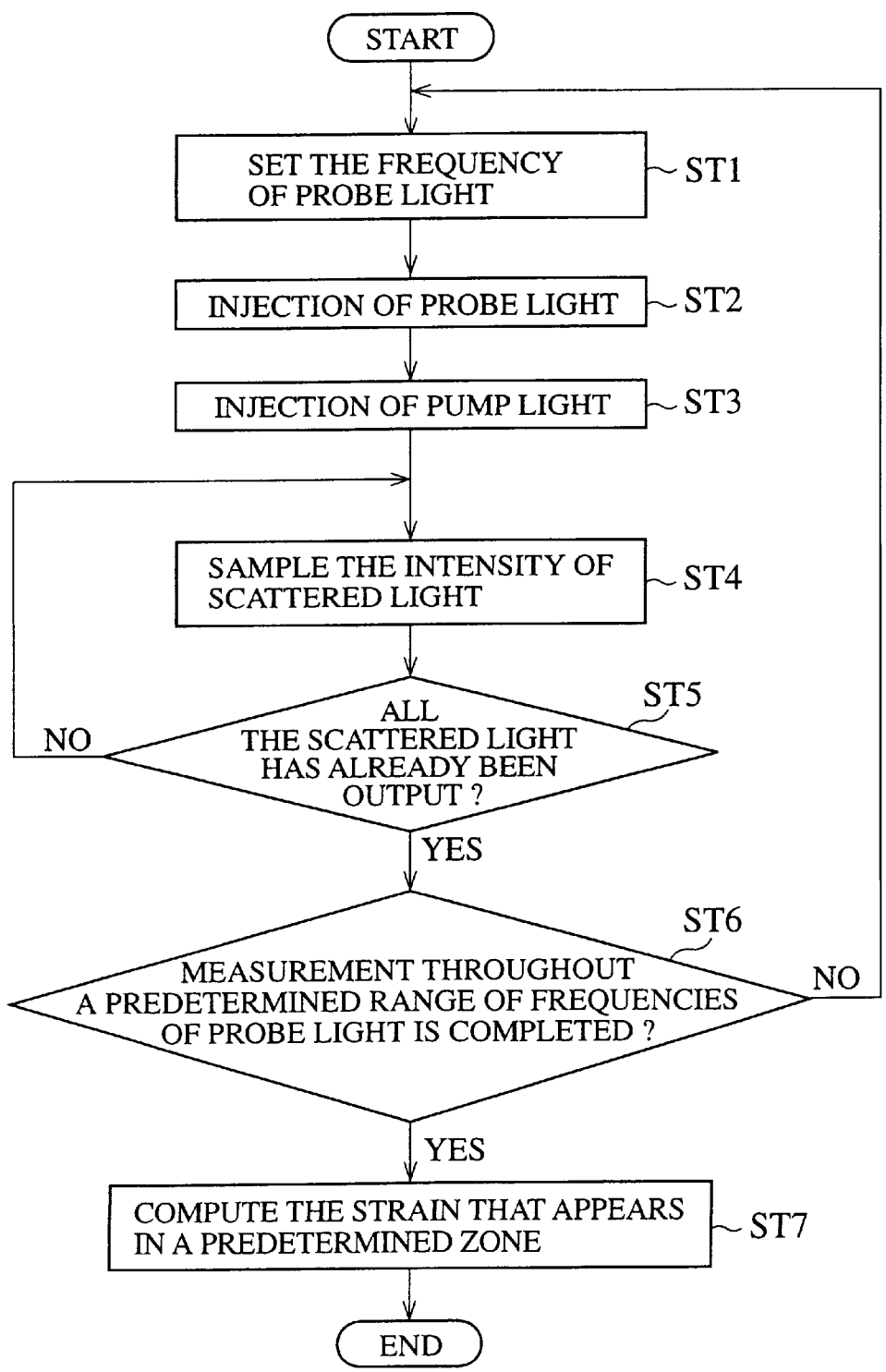
FIG. 2 is a flow chart showing the operation of the measurement device according to the first embodiment of the present invention.

Referring next to FIG. 2, there is illustrated a flow chart showing the operation of the measurement device according to the first embodiment of the present invention. In the figure, ST1 denotes a probe frequency setting step in which the control unit 20 sets the frequency of the discontinuous probe light emitted by the probe light source 4 to a certain value, vs, ST2 denotes a probe light injection step in which the probe light source 4 emits and injects discontinuous probe light into the optical fiber 2 under control of the control unit 20, ST3 denotes a pump light injection step in which the pump light source 3 emits and injects discontinuous pump light into the optical fiber 2 under control of the control unit 20 so that the probe light and the pump light collide with each other at an end of a predetermined zone set in this step, which is located on the side of the probe light source 4, within a measurement area of the optical fiber 2 secured to the structure 1. In addition, ST4 denotes a sampling step in which the light intensity measurement unit 5 samples the light intensity of the output light from the optical fiber, including relatively strong Brillouin scattered light generated by the interaction between the discontinuous pump light and the discontinuous probe light, ST5 denotes a first measurement completion determination step in which the control unit 20 determines if all the scattered light has already been output from the optical fiber, i.e., whether or not the measurement of the light intensity of the scattered light at the certain frequency vs set in the step ST1 has been carried out throughout the length of the optical fiber, and repeats the sampling step ST4 until the measurement is completed, ST6 denotes a second measurement completion determination step in which the control unit 20 determines whether or not the measurement of the light intensity of the Brillouin scattered light has been carried out throughout the predetermined range of frequencies of the probe light in which the Brillouin scattered light can be expected to be generated, and repeats the probe frequency setting step ST1 to the first measurement completion determination step ST5 until the measurement throughout the predetermined range of frequencies of the probe light is completed, and ST7 denotes a computation step in which the computation unit 8 computes the strain that appears in the predetermined zone, which has been defined in the optical fiber 2 in step ST3, based on the spectrum of the light intensity of the Brillouin scattered light associated with the predetermined zone, which has been measured by the light intensity measurement unit 5.

Figure 3:
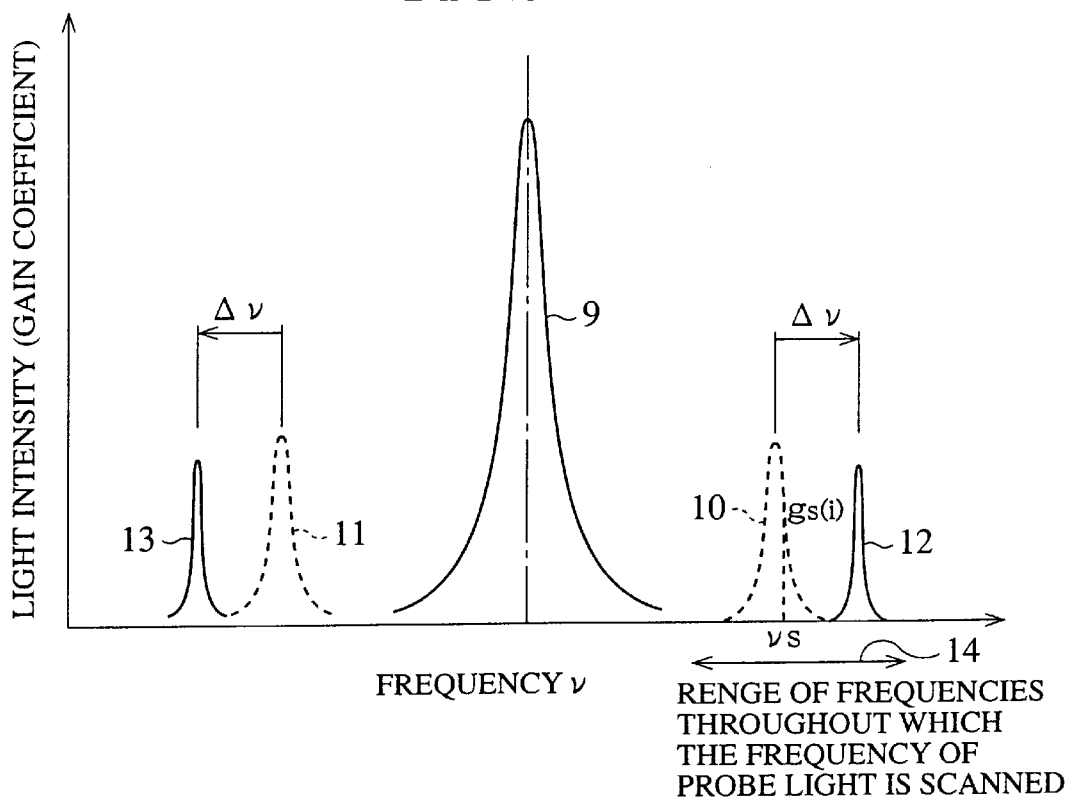
FIG. 3 is a graph showing an example of a spectrum of the light intensity (i.e., scattering gain coefficient) of Brillouin scattered light associated with a predetermined zone, which can be measured by the measurement device according to the first embodiment of the present invention.

Referring next to FIG. 3, there is illustrated a graph showing an example of the spectrum of the light intensity (i.e., scattering gain coefficient) of the Brillouin scattered light associated with the predetermined zone, which can be measured by the measurement device according to the first embodiment of the present invention. In the figure, the horizontal axis shows the frequency of the probe light, and the vertical axis shows the light intensity of the Brillouin scattered light. Reference numeral 9 denotes Rayleigh scattered light having a center frequency equal to that of the pump light, 10 denotes Stokes light in Brillouin scattering, 11 anti-Stokes light in Brillouin scattering, 12 denotes frequency-shifted Stokes light in Brillouin scattering, and 13 frequency-shifted anti-Stokes light in Brillouin scattering. In the figure, gs(i) is a scattering gain coefficient of Brillouin scattered light with a frequency equal to the set frequency vs of the discontinuous probe light. Stokes light in Raman scattering is also produced with a range of frequencies higher than that of the Stokes light in Brillouin scattering, and anti-Stokes light in Raman scattering is also produced with a range of frequencies lower than that of the anti-Stokes light in Brillouin scattering. A range of frequencies indicated by 14 as shown in FIG. 3 can be set as the frequency range throughout which the frequency of the probe light is scanned, i.e., the predetermined frequency range.

Figure 4:
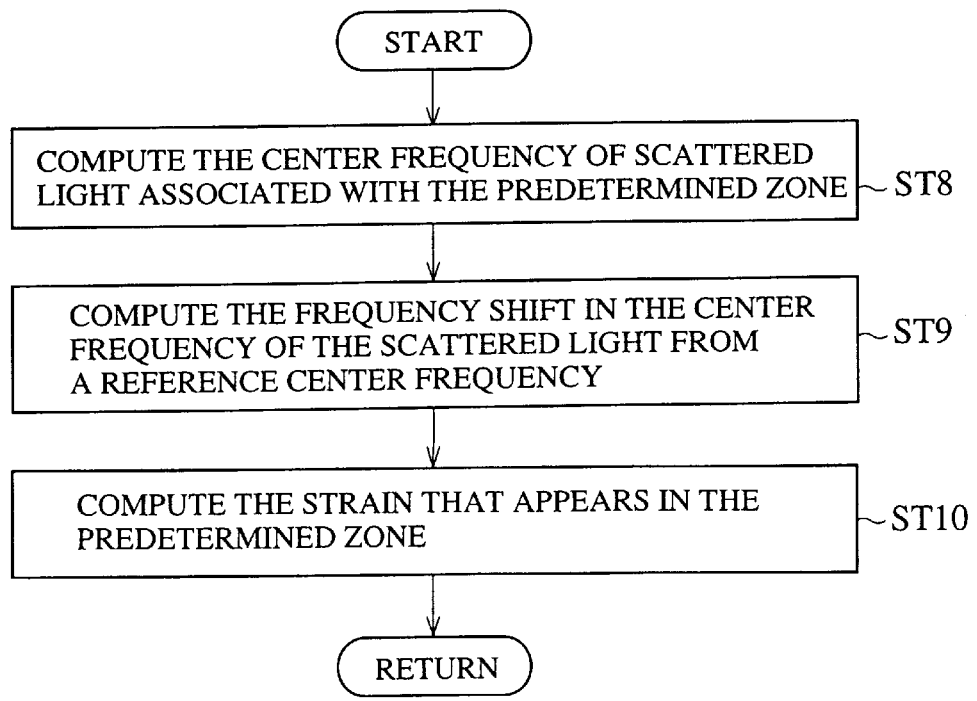
FIG. 4 is a flow chart showing detailed procedures of a computation step of FIG. 2, according to the first embodiment of the present invention.

Referring next to FIG. 4, there is illustrated a flow chart showing detailed procedures of the computation process of step ST7 as shown in FIG. 2, according to the first embodiment of the present invention. In the figure, ST8 denotes a center frequency computation step in which the computation unit 8 produces a spectrum of the light intensity of the Brillouin scattered light by plotting the light intensity data of the Brillouin scattered light associated with the predetermined zone, as shown in FIG. 3, which have been obtained by scanning the frequency of the probe light over the predetermined frequency range 14 in performing the steps ST1 to ST6, and then computes the center frequency of the Brillouin scattered light associated with the predetermined section from the spectrum. The center frequency of the Brillouin scattered light can be computed as the frequency of scattered light measured with the largest light intensity or scattering gain coefficient. ST9 denotes a frequency shift computation step in which the computation unit 8 computes a frequency shift in the center frequency of the Brillouin scattered light by computing the difference between the center frequency computed, in step ST8, for the predetermined zone, and a reference center frequency of Brillouin scattered light produced in the optical fiber 2, which was obtained in advance, and ST10 denotes a strain computation step in which the computation unit 8 computes the strain that appears in the predetermined zone based on the frequency shift in the center frequency of the Brillouin scattered light associated with the predetermined zone, which has been computed, in step ST9, according to a proven relationship between frequency shifts and strains.

Figure 5:
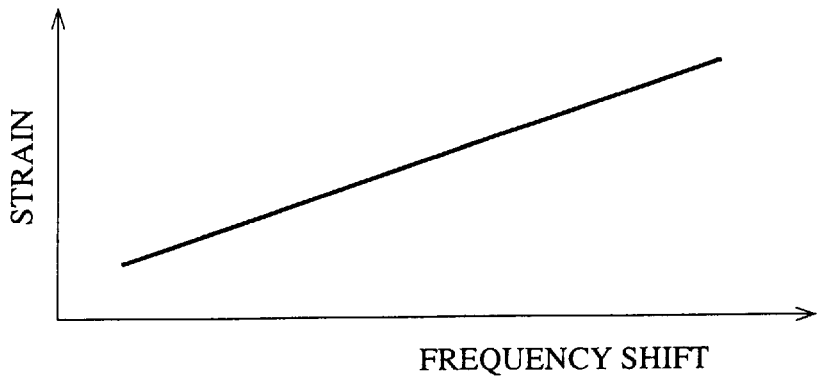
FIG. 5 is a graph showing an example of a proven relationship between frequency shifts and strains.

Referring next to FIG. 5, there is illustrated a graph showing an example of the proven relationship between frequency shifts and strains. In the figure, the horizontal axis shows frequency shifts, and the vertical axis shows strains.

As previously explained, in accordance with the first embodiment of the present invention, the probe light source 4 emits and injects the discontinuous probe light into an end of the optical fiber 2, the pump light source 3 emits and injects the discontinuous pump light into another end of the optical fiber 2 while controlling the injection timing of the discontinuous pump light into the optical fiber under control of the control unit 20, the light intensity measurement unit 5 measures Brillouin scattered light produced through the interaction between the discontinuous pump light and the discontinuous probe light, and the computation unit 8 then computes the strain that appears in a predetermined zone within the measurement area of the optical fiber 2 based on a frequency shift in the center frequency of the Brillouin scattered light associated with the predetermined zone. Thus the measurement device of the first embodiment can measure the strain that appears in the object 1 to be measured by measuring the strain that appears in the corresponding part of the optical fiber 2 secured to the object 1 to be measured. That is, the measurement device of the first embodiment can measure the strain that appears in a specified part of the object 1 to be measured with a spatial resolution equal to the length of the predetermined zone, which corresponds to half of the time duration or pulse width of the discontinuous pump light, the predetermined zone being determined by the injection timing of the discontinuous probe and pump light into the optical fiber 2.

As can be seen from the above description, the measurement device can measure the strain that appears in an arbitrary zone of the optical fiber 2 by shifting the predetermined zone by controlling both the injection timing of the discontinuous pump light and the injection timing of the discontinuous probe light into the optical fiber 2, thus obtaining a distribution of strain in the measurement area defined in the optical fiber.

In accordance with the first embodiment of the present invention, the measurement device can measure a distribution of temperature in the object 1 to be measured by using a relationship between temperatures of the structure 1, which are measured when there is no strain in the structure 1, and frequency shifts in the center frequency of Brillouin scattered light, instead of measuring a distribution of strain that appears in the object 1 to be measured using Brillouin scattered light.

In addition, the measurement device of the first embodiment can measure a magnetic field distribution with a high spatial resolution by using an optical fiber covered with a magnetostrictive material.

Second Embodiment

In accordance with a second embodiment of the present invention, a measurement device comprises a light intensity measurement unit 5 that can sample the light intensity of Brillouin scattered light at predetermined effective sampling intervals of Ts, for example 0.5 nsec (in this case, the effective sampling rate is 2 Ghz), and a computation unit 8 that can compute the strain that appears in each of a plurality of equal small sections into which a measurement area defined in an optical fiber 2 is divided, thus obtaining a distribution of strain that appears in the measurement area. The other structure of the measurement device of the second embodiment is the same as that of the measurement device of the aforementioned first embodiment, and therefore the description of the other structure will be omitted hereinafter. In fact, the sampling process is carried out at a sampling rate of 4 to 5 Ghz, that is, at sampling intervals of 0.25 to 0.2 nsec, by the light intensity measurement unit 5. In the present invention, the aforementioned effective sampling intervals (or effective sampling period) are referred to as time intervals at which intensity data are selected or extracted from a plurality of intensity data sampled, for use with the computation of the center frequency of Brillouin scattered light. For example, selecting every other data from the plurality of intensity data sampled at a sampling rate of 4 Ghz corresponds to a case that the predetermined effective sampling period (predetermined sampling intervals) Ts is 0.5 nsec. Each pulse included in the discontinuous pump light can typically have a time duration or pulse width of 20 nsec, and each pulse included in the discontinuous probe light can have an arbitrary time duration or pulse width. For simplicity, assume that the discontinuous probe light has a width of 20 nsec.

Referring next to FIG. 6(a), there is illustrated a diagram showing the plurality of small sections defined in the measurement area defined in the optical fiber 2, according to the second embodiment of the present invention. In the figure, an arrow parallel to the optical fiber 2 shows Z axis indicating the absolute position of the optical fiber 2, L denotes the length of the optical fiber 2, and z(1) to z(m) denote the plurality of small sections, into which the measurement area secured to the structure 1 is divided, respectively. n is the number obtained by dividing the pulse width of the discontinuous pump light by the effective sampling period Ts, which shows how many small sections contribute to a generation of Brillouin scattered light whose light intensity is sampled at the predetermined sampling intervals. As mentioned later, the pulse width of the discontinuous pump light corresponds to the length of 2 n small sections. In the second embodiment, n is 40 (=20 nsec/0.5 nsec). Referring next to FIGS. 6(b) and 6(c), there are illustrated diagrams exemplarily showing the configuration of the plurality of small sections and the length of each of them. If the discontinuous pump light collides with the discontinuous probe light at t=0, as shown in FIG. 6(b), part of the optical fiber measured by the head portion of the discontinuous probe light is a section where the head portion of the discontinuous probe light travels during an interval between an instant at which the head portion of the discontinuous probe light collides with the head of the discontinuous pump light and an instant at which the head portion of discontinuous probe light and the end of the discontinuous pump light pass each other, i.e., a series of z(1) to z(n) (having a length corresponding to (n×Ts/2)). In addition, as shown in FIG. 6(c) at t=Ts/2, part of the optical fiber measured by the next portion located at Ts behind the head portion of the discontinuous probe light is a section where the next portion of the discontinuous probe light travels during an interval between an instant at which the next portion of the discontinuous probe light collides with the head of the discontinuous pump light and an instant at which the next portion of discontinuous probe light and the end of the discontinuous pump light pass each other, i.e., a series of z(2) to z(n+1) (having a length corresponding to (n×Ts/2)). That is, the section measured by the next portion of the discontinuous probe light is shifted to the side of the probe light source 4 by dz, i.e., one small section, with respect to the section measured by the head portion of the discontinuous probe light. Similarly, part of the optical fiber measured by the next portion, one located at 2Ts behind the head portion of the discontinuous probe light, is a section where the third portion of the discontinuous probe light travels during an interval between an instant at which the third portion of the discontinuous probe light collides with the head of the discontinuous pump light and an instant at which the next portion of discontinuous probe light and the end of the discontinuous pump light pass each other, i.e., a series of z(3) to z(n+2). In this manner, the plurality of small sections z(i) (i=1, . . . , m) can be defined. The pulse width of the discontinuous pump light corresponds to the length of a series of 2 n small sections, as can be seen from FIGS. 6(b) and 6(c).

For example, in order to obtain a spatial resolution of 5 cm, i.e., to set the length of each of the plurality of small sections to 5 cm, the effective sampling period Ts has to be set to 0.5 nsec (=(2×0.05 m)/2×10$^8$ m/s, assuming that the light speed is 2×10$^8$ m/s). The effective sampling period Ts is thus determined by the desired spatial resolution. Small sections z(m+1), . . . , z(M+n−1) are a part of the optical fiber which is located adjacent to the object 1 to be measured, which will be referred to as a reference fiber portion. On the other hand, the part of the optical fiber 2 secured to the object 1 to be measured will be referred to as a detection fiber portion. As an alternative, the reference fiber portion can be a series of small sections z(1), . . . , z(n−1), i.e., is an end portion of the optical fiber on which the pump light is incident. In this case, the detection fiber portion is a series of small sections z(n), . . . , z(M+n−1).

Figure 8:
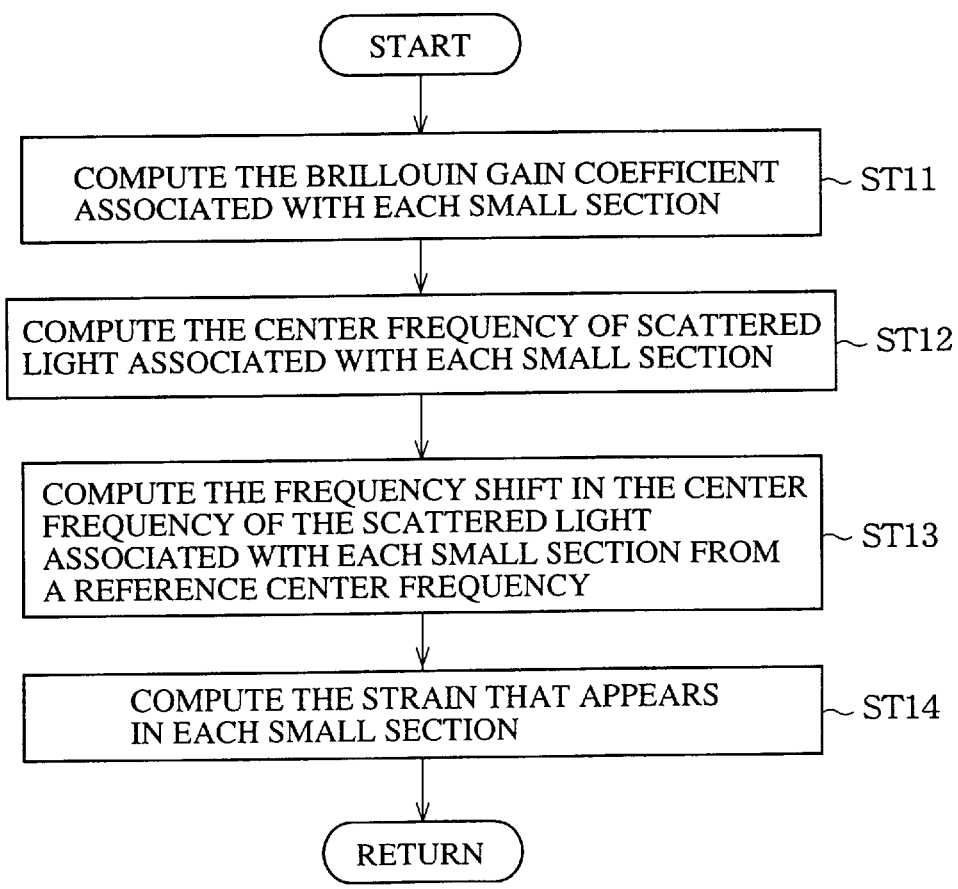
FIG. 8 is a flow chart showing detailed procedures of a computation step of FIG. 7.
Figure 7:
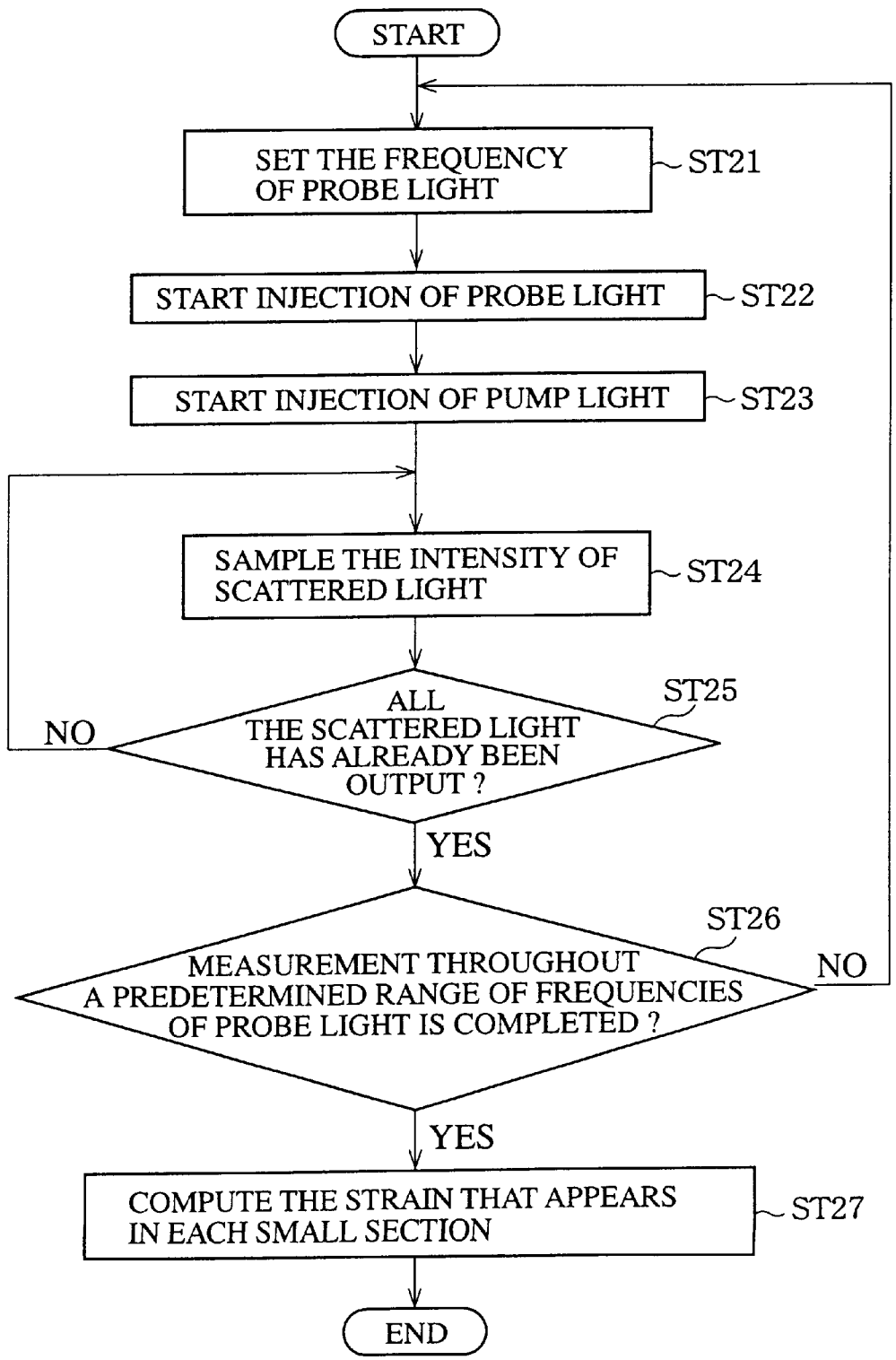
FIG. 7 is a flow chart showing the operation of a measurement device according to the second embodiment of the present invention.
Figure 9:
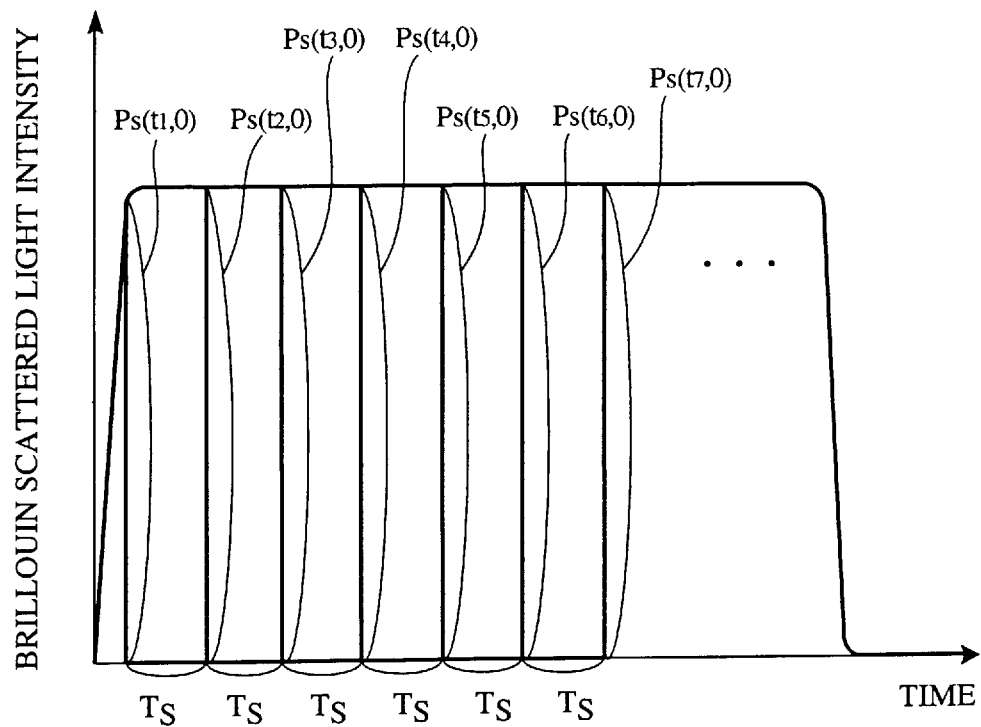
FIG. 9 is a diagram showing the light intensity of Brillouin scattered light measured by a light intensity measurement unit of the measurement device according to the second embodiment of the present invention.

Referring next to FIG. 7, there is illustrated a flow chart showing the operation of the measurement device according to the second embodiment of the present invention. In the figure, ST21 denotes a probe frequency setting step in which the control unit 20 sets the frequency of the discontinuous probe light emitted by probe light source 4 to a certain value vs, ST22 denotes a probe light injection start step in which the probe light source 4 starts injecting discontinuous probe light including a series of pulses into the optical fiber 2 under control of the control unit 20, ST23 denotes a pump light injection start step in which the pump light source 3 starts emitting and injecting discontinuous pump light including a series of pulses into the optical fiber 2 under control of the control unit 20 so that a pulse of the probe light and a corresponding pulse of the pump light collide with each other at an end of a predetermined zone, which is located on the side of the probe light source 4, within a measurement area of the optical fiber 2 secured to the structure 1, while controlling the injection timing of each pulse of the discontinuous pump light into the optical fiber 2 under control of the control unit 20 so that the predetermined zone is shifted. In addition, ST24 denotes a sampling step in which the light intensity measurement unit 5 samples the light intensity of the output light from the optical fiber, including high-intensity Brillouin scattered light generated by the interaction between the discontinuous pump light and the discontinuous probe light, ST25 denotes a first measurement completion determination step in which the control unit 20 determines if all the scattered light has already been output from the optical fiber, i.e., whether or not the measurement of the light intensity of the scattered light at the certain frequency vs set in the step ST1 has been carried out throughout the length of the optical fiber while the predetermined zone has been shifted within the measurement area, and repeats the sampling step ST24 until the measurement is completed, ST26 denotes a second measurement completion determination step in which the control unit 20 determines whether or not the measurement of the light intensity of the Brillouin scattered light has been carried out throughout the predetermined range of frequencies of the probe light in which the Brillouin scattered light is expected to be generated, and repeats the probe frequency setting step ST21 to the first measurement completion determination step ST25 until the measurement throughout the predetermined range of frequencies of the probe light is completed, and ST27 denotes a computation step in which the computation unit 8 computes the strain that appears in each of the plurality of small sections defined in the optical fiber 2, based on the spectrum of the light intensity of the Brillouin scattered light associated with each of the plurality of small sections, which has been measured by the light intensity measurement unit 5. FIG. 8 shows detailed procedures of the computation process in step ST27 of FIG. 7. In the figure, ST11 denotes a gain coefficient computation step in which the computation unit 8 computes the scattering gain coefficient at the set frequency of the probe light for each of the plurality of small sections from the plurality of intensity data $Ps(t_1, 0)$, $Ps(t_2,0)$, $Ps(t_3,0)$, ... ($Ps(t_1 0)$ is the intensity data at Z=0 measured at time $t_i$) of the Brillouin scattered light, as shown in FIG. 9, which have been sampled at the predetermined sampling intervals of 0.5 nsec. The first intensity data $Ps(t_1,0)$ shown in FIG. 9 is the light intensity data of Brillouin scattered light associated with the plurality of small sections z(1) to z(n), which has been produced by the head portion of the discontinuous probe light. Similarly, the intensity data $Ps(t_1,0)$ (i is an integer equal to or greater than 2) is the intensity data of Brillouin scattered light associated with the plurality of small sections z(i) to z(i+n-1), which has been produced by the i-th portion located at Ts(i-1) (Ts: effective sampling period) behind the head portion of the discontinuous probe light. In FIG. 8, ST12 denotes a center frequency computation step in which the computation unit 8 produces a spectrum of the light intensity of the Brillouin scattered light by plotting the light intensity data of the Brillouin scattered light associated with each of the plurality of small sections, which have been obtained by scanning the predetermined frequency vs of the probe light in performing the steps ST21 to ST26, and then computes the center frequency of the Brillouin scattered light associated with each of the plurality of small sections from the spectrum, ST13 denotes a frequency shift computation step in which the computation unit 8 computes a frequency shift in the center frequency of the Brillouin scattered light by computing the difference between the center frequency computed, in step ST12, for each of the plurality of small sections, and a reference center frequency of Brillouin scattered light produced in the optical fiber 2, which was obtained in advance, and ST14 denotes a strain computation step in which the computation unit 8 computes the strain that appears in each of the plurality of small sections from the frequency shift in the center frequency of the Brillouin scattered light associated with each of the plurality of small sections, which has been computed, in step ST13, for each of the plurality of small sections, according to a proven relationship between frequency shifts and strains.

The following equation (5) shows a matrix operation used for computing the scattering gain coefficient of the scattered light associated with each of the plurality of small sections at the set frequency vs of the probe light in the gain coefficient computation step ST11 of the second embodiment.

scattered light associated with the small section z(j) at the set frequency vs of the discontinuous probe light, and a(i,j) is a contribution factor showing the ratio of the light intensity data of the Brillouin scattered light associated with the small section z(j) (j=i, ... , (i+n-1)) to the variable Qs(i). The contribution factor a(i,j) can be determined by considering that the discontinuous pump light is not a perfect rectangular wave and is attenuated while it passes through the optical fiber 2, as will be described later.

In fact, the above-mentioned equation (5) is obtained by reformulating the following equation (6) shown in integration notation.

$$\ln Ps(t, 0) = \int_{z_0}^{z_e} g(z, v) \cdot Sp(z) dz - \alpha s L + \ln\left\{Ps\left(t - \frac{L}{C}, L\right)\right\} \quad (6)$$

Figure 10:
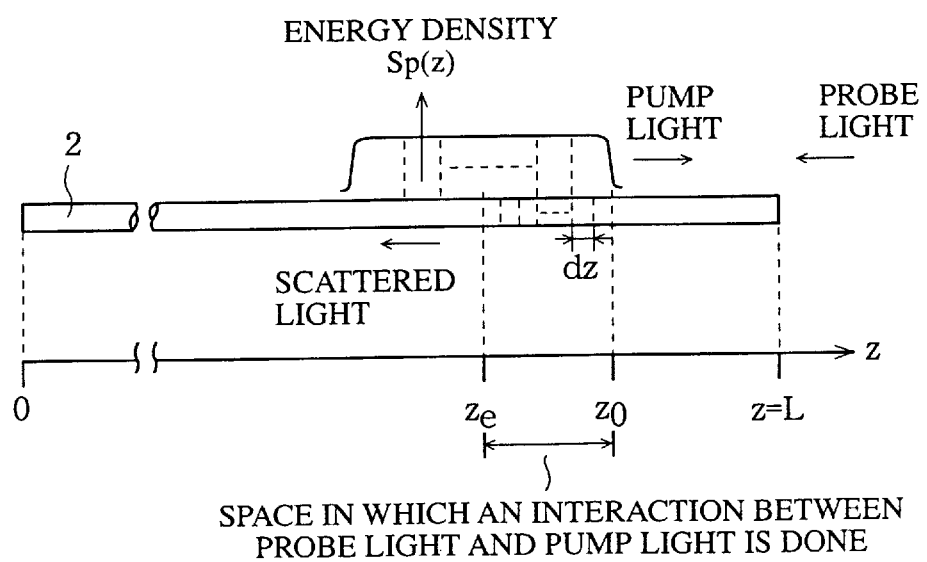
FIG. 10 is a diagram showing a relationship between variables in an equation shown in integration notation from which a matrix operation used for computing the scattering gain coefficient of the scattered light associated with each of a plurality of small sections can be derived.

FIG. 10 shows a relationship between the variables shown in the equation (6). In the above equation (6), Ps(t,0) is the actually-measured light intensity of Brillouin scattered light or probe light at Z=0 measured at time t, Ps(t-L/c,L) is the actually-measured light intensity of the probe light at Z=L measured at time (t-L/c), g(Z,v) is a gain coefficient, Sp(Z) is an energy density which can be obtained by dividing the light intensity of the pump light by its cross-sectional area (i.e., the cross-sectional area of the fiber core), dz is the length of one small section defined in the pump light, $\alpha s$ is an attenuation coefficient of the probe light, L is the total length of the optical fiber 2, and c is the light speed of the discontinuous probe light in the optical fiber 2. The left side of the equation (6) is the natural logarithm of the light intensity measured by the light intensity measurement unit 5, the first term in the right side corresponds to the light intensity of scattered light associated with a series of plural small sections, i.e., Qs(i), the second term in the right side corresponds to an attenuation of the probe light in the optical fiber 2, and the third term in the right side is the natural logarithm of the light intensity of the probe light incident on the optical fiber 2. Substituting a(i,j)=Sp(z).dz in the equation (6) and expressing the equation (6) in discrete form yields $\{Qs(i)\}=[a(i,j)]\{g(Z,v)\}$ which is equivalent to the above-mentioned equation (5) shown in matrix notation.

The computation unit 8 computes the variable Qs(i) according to the following equation (7) which can be obtained from the aforementioned equation (6), before computing the scattering gain coefficient gs(i) of the scattered light associated with each of the plurality of small sections z(i) (i=1, ... , m) according to the aforementioned equation (5).

$$\begin{pmatrix} a(1,1) & a(1,2) & \cdots & a(1,n) & 0 & \cdots & \cdots & \cdots & \cdots & 0 \\ 0 & a(2,2) & a(2,3) & \cdots & a(2,n+1) & 0 & \cdots & \cdots & \cdots & 0 \\ \vdots & & \ddots & & & & & & & \vdots \\ 0 & \cdots & \cdots & a(i,i) & a(i,i+1) & \cdots & a(i,i+n-1) & 0 & \cdots & 0 \\ \vdots & & & & \ddots & & & & & \vdots \\ 0 & \cdots & \cdots & \cdots & a(m,m) & a(m,m+1) & \cdots & \cdots & \cdots & a(m,m+n-1) \end{pmatrix} \begin{pmatrix} gs(1) \\ gs(2) \\ \vdots \\ gs(i) \\ \vdots \\ gs(m) \\ \vdots \\ gs(m+n-1) \end{pmatrix} = \begin{pmatrix} Qs(1) \\ Qs(2) \\ \vdots \\ Qs(i) \\ \vdots \\ Qs(m) \end{pmatrix} \quad (5)$$

In the equation, Qs(i) (i=1, ... , m) is a variable determined by at least the intensity data of the Brillouin scattered light associated with the plurality of small sections z(i) to z(i+n-1), as shown in FIG. 6(*a*), and the light intensity data of the probe light incident on the optical fiber 2, which have been obtained at the set frequency vs of the discontinuous probe light, gs(j) is the scattering gain coefficient of the $$Qs(i) = \ln\left\{\frac{Ps(t, 0)}{Ps\left(t - \frac{L}{C}, L\right)}\right\} + \alpha_s L \tag{7}$$

Figure 11:
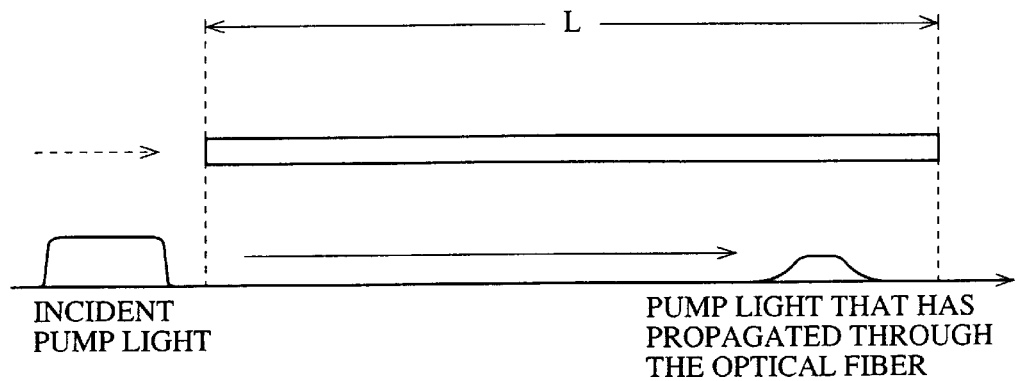
FIG. 11 is a diagram showing the propagation characteristic of pump light propagating through the optical fiber.
Figure 12:
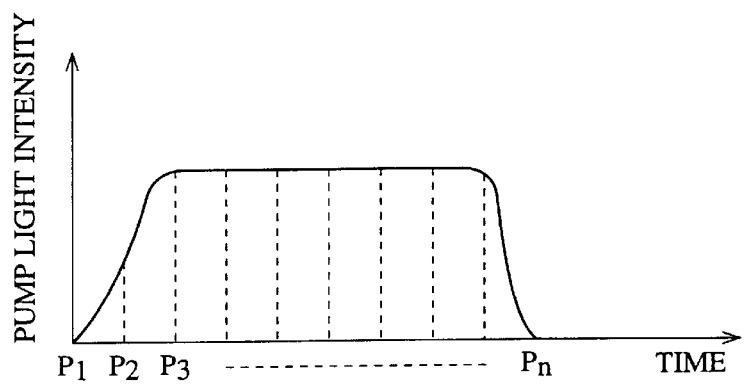
FIG. 12 is a diagram showing an example of the waveform of the pump light incident on the optical fiber.

Next, a description will be made as to a way of computing the contribution factor a(i,j) showing the ratio of the light intensity data of the Brillouin scattered light associated with the small section z(j) (j=i, . . . , (i+n−1)) to the variable Qs(i). Referring next to FIG. 11, there is illustrated a diagram showing the propagation characteristic of the pump light propagating through the optical fiber 2. As shown in FIG. 11, as the pump light incident on one end of the optical fiber 2 propagates through the optical fiber 2, the amplitude of the pump light is attenuated and the pulse profile of the pump light pulse is changed. Referring next to FIG. 12, there is illustrated a diagram showing an example of the waveform of the pump light incident on the optical fiber 2. In the figure, the horizontal axis shows time, and the vertical axis shows the light intensity of the pump light. Assuming that the pump light is divided into n small pump light parts Pk (k=1 to n) in units of the length dz of each of the plurality of small sections, as shown in the figure, the following contribution factor computation equation (8) used for computing the computation factor a(i,j) for each of the plurality of small sections can be obtained.

$$a(i, j) = \frac{Pk(0)}{A} e^{-\alpha_p z} \cdot dz \tag{8}$$

where Pk(0) is the light intensity of the k-th small pump light part Pk when it is incident on one end of the optical fiber, A is the cross-sectional area of the optical fiber core, $\alpha_p$ is an attenuation coefficient of the pump light, z is the distance from the end of the optical fiber, and dz is the length of each of the plurality of small sections. The computation unit 8 computes the contribution factor a(i,j) for each of the plurality of small sections based on the equation (8) based on the relationship between the waveform, as shown in FIG. 12, of the pump light when it is incident on the optical fiber and the position of each of the plurality of small sections, z(j), which is associated with each small pump light part Pk.

Then, according to the second embodiment, substituting a value computed according to the above-mentioned equation (7) to the variable Qs(i), a value computed according to the above-mentioned equation (8) to the contribution factor a(i,j), and a reference value of the scattering gain coefficient when there is no strain in the optical fiber 2 to each of gs(m+), . . . , gs(m+n−1) in the above-mentioned equation (5) yields the scattering gain coefficient gs(i) of the scattered light associated with each of the plurality of small sections z(i) (i=1, . . . , m). The scattering gain coefficient gs(i) has a value corresponding to the variable Qs(i) determined by the light intensity of the Brillouin scattered light associated with each of the plurality of small sections z(i). So, plotting the scattering gain coefficients gs(i) of the scattered light associated with each of the plurality of small sections z(i), which have been obtained by scanning the set frequency vs of the discontinuous probe light over the predetermined frequency range, on a graph yields a distribution of scattering gain coefficients like the spectrum of light intensities as shown in FIG. 3. The computation unit 8 can then, in the center frequency computation step ST12, compute the center frequency of the Brillouin scattered light associated with each of the plurality of small sections z(i) based on the scattering gain coefficients gs(i) instead of the variables determined by the light intensities of the Brillouin scattered light associated with each of the plurality of small sections z(i).

As previously explained, in accordance with the second embodiment of the present invention, the measurement device can sample the light intensity of scattered light at the predetermined effective sampling intervals of Ts, which corresponds to two times the length of each small section z(i) and then compute the strain that appears in each of the plurality of small sections z(i) whose length (e.g., 5 cm) is smaller than the length of a certain section determined by the pulse width of the discontinuous pump light, by computing the scattering gain coefficient of the scattered light associated with each of the plurality of small sections using the above-mentioned equation (5) by means of the computation unit 8, regardless of a limitation (e.g., 20 nsec) imposed on the pulse width of the discontinuous pump light.

In addition, since the computation unit 8 can compute the variable Qs(i) based on the light intensity Ps(t,0) of the Brillouin scattered light measured by the light intensity measurement unit 5, the light intensity Ps(t−L/c,0) of the incident probe light, and an attenuation of the probe light in the optical fiber 2, in order to compute the scattering gain coefficient gs(i) of the scattered light associated with each of the plurality of small sections z(i) (i=1, . . . , m), it can compute the strain that appears in each of the plurality of small sections using the variable Qs(i) which has been corrected for an attenuation of the Brillouin scattered light caused by the attenuation of the probe light in the optical fiber 2, and which is closer to the real value of the light intensity of the Brillouin scattered light associated with each of the plurality of small sections. Furthermore, the computation unit 8 can compute the contribution factor a(i,j) for each of the plurality of small sections in consideration of the attenuation of the discontinuous pump light in the optical fiber, thus being able to reduce errors that can occur in the scattering gain coefficient gs(i) of the scattered light associated with each of the plurality of small sections.

In addition, since the measurement device according to the second embodiment of the present invention can measure the strain with a higher spatial resolution z(i) than that provided by prior art measurement devices, it can be applied to equipment such as a generator, an artificial satellite, an airplane, or an elevator cable, in order to efficiently measure a distribution of strain that appears therein, as well as to a structure such as a bridge, a covered road, or a building.

In accordance with the second embodiment of the present invention, the measurement device can measure the temperature of each of the plurality of small sections z(i) in the object 1 to be measured by using a relationship between temperatures of the structure 1, which were measured when there was no strain in the structure 1, and frequency shifts that occurred in the Brillouin scattered light, instead of measuring the strain that appears in each of the plurality of small sections z(i) in the object 1 to be measured using the Brillouin scattered light. As an alternative, the measurement device can measure the temperature of each of the plurality of small sections z(i) in the object 1 to be measured by using a relationship between temperatures of the structure 1 and light intensities of Raman scattered light.

Third Embodiment

Figure 13A:
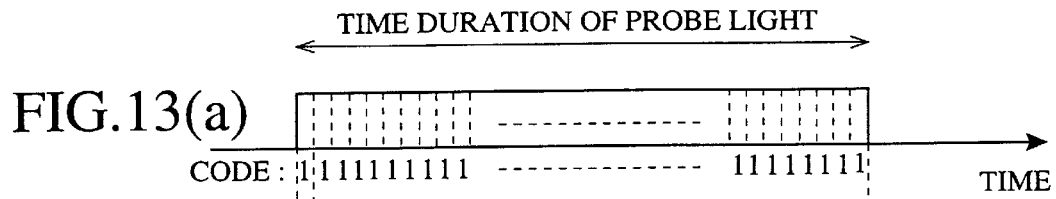
FIG. 13(a) is a diagram showing the waveform of discontinuous probe light for use with the measurement device according to the second embodiment of the present invention.
Figure 13B:
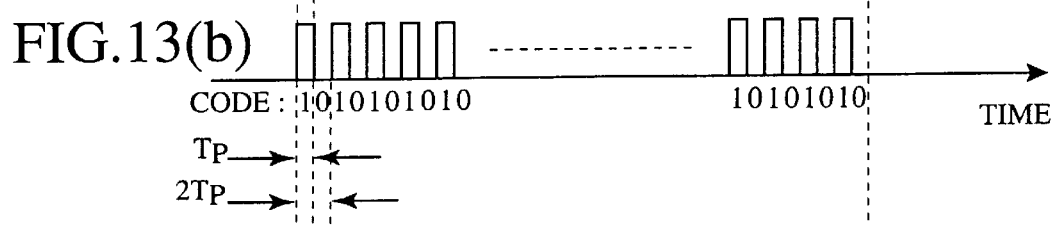
FIG. 13(b) is a diagram showing the waveform of discontinuous probe light for use with a measurement device according to a third embodiment of the present invention.

Referring next to FIG. 13(b), there is illustrated a diagram showing the waveform of discontinuous probe light for use with a measurement device according to a third embodiment of the present invention. As shown in FIG. 13(b), the discontinuous probe light is comprised of a series of probe light pulses having a fixed pulse repetition period 2 Tp, which can be obtained by dividing a single pulse, as shown in FIG. 13(a), having a certain duration or pulse width, in units (or intervals) of one predetermined time period Tp (which corresponds to the predetermined effective sampling period Ts), which corresponds to two times the length of each of a plurality of equal small sections z(i), as shown in FIG. 6(a), into which a measurement area of the optical fiber 2 is divided. In order to measure the light intensity of scattered light associated with a predetermined zone comprised of plural small sections, the probe light source 4 further emits other discontinuous probe light, as shown in FIG. 13(c), comprised of a series of probe light pulses having a fixed pulse repetition period 2 Tp, which are delayed by Tp with respect to the first discontinuous probe light as shown in FIG. 13(b), and injects the other discontinuous probe light into the optical fiber 2 under control of the control unit 20 so that the other discontinuous probe light collides with corresponding discontinuous pump light at the same predetermined zone.

Figure 13C:
FIG. 13(c) is a diagram showing the waveform of other discontinuous probe light, which pairs up with the probe light of FIG. 13(b), for use with the measurement device according to the third embodiment of the present invention.

The length of a predetermined zone to be measured by the two discontinuous probe light beams, as shown in FIGS. 13(b) and 13(c), each comprised of a series of light pulses is determined by both the pulse width (e.g., 20 nsec) of the discontinuous pump light and the certain time period (e.g., 20 nsec) during which the series of light pulses included in the first or second discontinuous probe light exist. In addition, the length of each of the plurality of small sections z(i) is determined by the predetermined time period Tp. In fact, the predetermined time period Tp is defined so that a desired spatial resolution is provided, that is, the length of each of the plurality of small sections z(i) is set to a desired one. For example, when the discontinuous pump light has a pulse width of 20 nsec, one predetermined zone measured by one probe light pulse corresponds to an interval between an instant at which the head of the probe light pulse collides with the head of the discontinuous pump light and an instant at which the head of probe light pulse and the end of the discontinuous pump light pass each other, i.e., 10 nsec, in this case, it is equal to about 2 m (=2×10$^8$m/sec×10×10$^{-9}$, assuming that the light speed is about 2×10$^8$m/sec).

In addition, the pulse width of each of the series of probe light pulses included each discontinuous probe light is typically 0.5 nsec, as shown in FIGS. 13(b) and 13(c), and the pulse repetition period of the series of probe light pulses is fixed and is typically 1.0 nsec. The probe light source 4 injects the first discontinuous probe light comprised of the series of light pulses as shown in FIG. 13(b) into the fiber first. The probe light source 4 then injects the second discontinuous probe light comprised of the series of light pulses as shown in FIG. 13(c), which are delayed by 0.5 nsec with respect to the first discontinuous probe light of FIG. 13(b), into the optical fiber 2. In this case, the length of each of the plurality of small sections is equal to about 5 cm (=0.05 m=2×10$^8$ m/sec×0.25×10$^{-9}$, assuming that the light speed is about 2×10$^8$ m/sec). Accordingly, one predetermined zone measured by each probe light pulse included in each discontinuous probe light includes 40 (=2 m/0.05 m) small sections. In addition, one zone measured by each probe light pulse included in each discontinuous probe light as shown in FIG. 13(b) or 13(c) is the one which is shifted from another zone measured by the next probe light pulse included in the same discontinuous probe light towards the probe light source 4 by two small sections.

In the third embodiment of the present invention, the single discontinuous probe light, as shown in FIG. 13(a), used in the first through second embodiments, can be represented as a code "1111 . . . " when each light pulse with a time duration Tp is represented as "1" and each interval Tp during which there exists a light pulse with zero amplitude is represented as "0". Thus the first discontinuous probe light as shown in FIG. 13(b) can be represented as a code "1110 . . . ", and the second discontinuous probe light as shown in FIG. 13(c), which pairs up with the first discontinuous probe light of FIG. 13(b), can be represented as a code "0101 . . . ". The other structure of the measurement device according to the third embodiment of the present invention is the same as that of the measurement device of the aforementioned second embodiment, and therefore the description of the other structure will be omitted hereinafter.

In order to measure a distribution of strain that appears in a certain measurement area defined in the optical fiber 2, the probe light source 4 injects one discontinuous probe light including a series of light pulses as shown in FIG. 13(b) into the optical fiber 2 under control of the control unit 20, first. The following equation (9) shows a matrix operation used for computing scattering gain coefficients in the gain coefficient computation step ST11 according to the third embodiment.

$$\begin{pmatrix} a(1,1) & a(1,2) & a(1,3) & \cdots & \cdots & a(1,n) & 0 & 0 & 0 & 0 & 0 & \cdots & \cdots & 0 \\ 0 & 0 & a(3,3) & a(3,4) & \cdots & \cdots & a(3,n+1) & a(3,n+2) & 0 & 0 & 0 & \cdots & \cdots & 0 \\ 0 & 0 & 0 & 0 & a(5,5) & \cdots & \cdots & \cdots & a(5,n+3) & a(5,n+4) & 0 & \cdots & \cdots & 0 \\ \vdots & & & & & \vdots & & & & & & & & \vdots \\ 0 & 0 & & \cdots & 0 & a(m-1,m-1) & \cdots & \cdots & \cdots & \cdots & \cdots & \cdots & a(m-1,m+n-2) & 0 \\ 0 & a(2,2) & a(2,3) & \cdots & \cdots & a(2,n) & a(2,n+1) & 0 & 0 & 0 & 0 & \cdots & & 0 \\ 0 & 0 & 0 & a(4,4) & a(4,5) & \cdots & \cdots & a(4,n+2) & a(4,n+3) & 0 & 0 & \cdots & & 0 \\ 0 & 0 & 0 & 0 & 0 & a(6,6) & \cdots & \cdots & \cdots & a(6,n+4) & a(6,n+5) & 0 & \cdots & 0 \\ \vdots & & & & & \vdots & & & & & & & & \vdots \\ 0 & 0 & \cdots & \cdots & 0 & 0 & \cdots & \cdots & 0 & a(m,m) & \cdots & \cdots & \cdots & a(m,m+n-1) \end{pmatrix} \quad (9)$$

$$\begin{pmatrix} gs(1) \\ gs(2) \\ gs(3) \\ \vdots \\ gs(m) \\ \vdots \\ gs(m+n-1) \end{pmatrix} = \begin{pmatrix} Qs(1,1) \\ Qs(1,3) \\ Qs(1,5) \\ \vdots \\ Qs(1,m-1) \\ Qs(2,2) \\ \vdots \\ Qs(2,m) \end{pmatrix}$$

Figure 14A:
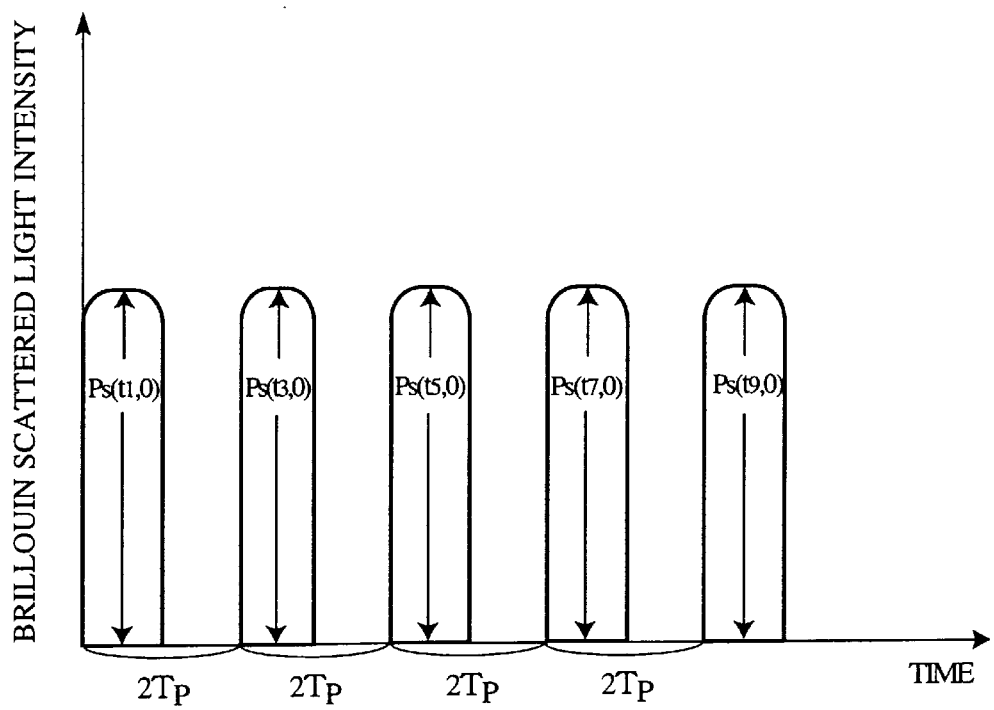
FIGS. 14(a) and 14(b) are diagrams each showing the light intensity of Brillouin scattered light measured by a light intensity measurement unit of the measurement device according to the third embodiment of the present invention.
Figure 14B:
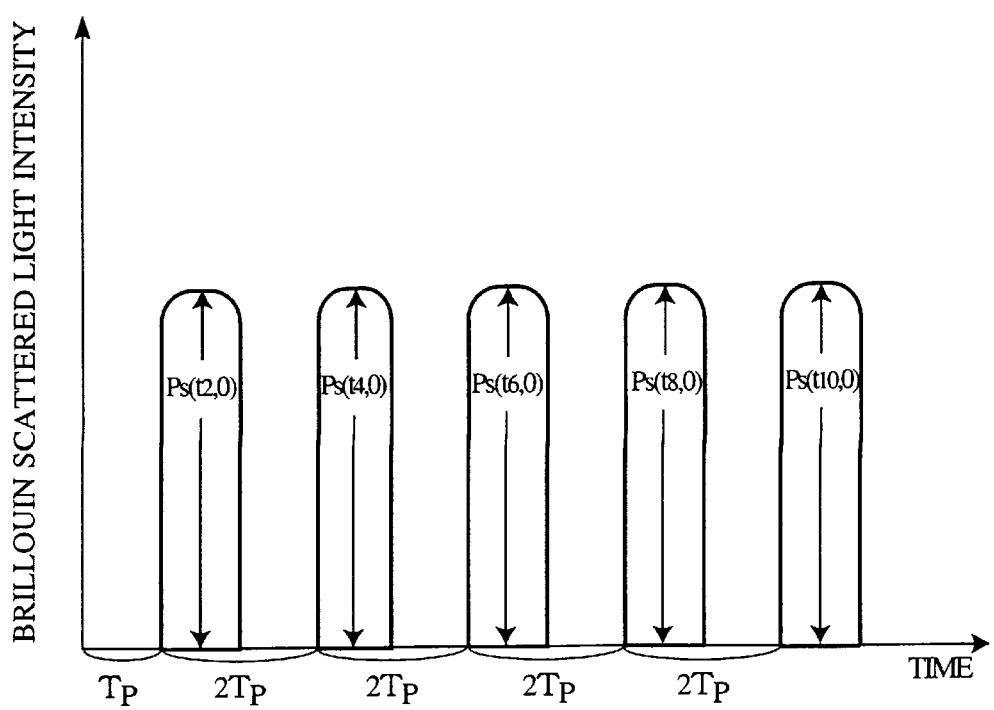

As shown in the equation (9), a series of small sections which contributes to Brillouin scattered light associated with each probe light pulse included in the discontinuous probe light is the one which is shifted from another series of small sections which contributes to Brillouin scattered light associated with either of the previous or next probe light pulse included in the same discontinuous probe light by two small sections. For example, if a series of small sections simultaneously measured by one light pulse is a group of z(i), z(i+1), . . . , z(i+n−1), another series of small sections simultaneously measured by the next light pulse is a group of z(i+2), z(i+3), . . . , z(i+n+1) (see FIG. 6). Variables Qs(1), Qs(3), Qs(5), . . . can be computed from a plurality of light intensity data of Brillouin scattered light produced by the series of probe light pulses included in the first probe light; Ps(t1,0), Ps(t3,0), Ps(t5,0), . . . , as shown in FIG. 14(a). The probe light source 4 further injects the second probe light with the same frequency vs, including the series of probe light pulses, as shown in FIG. 13(c), which is delayed by 0.5 nsec with respect to the series of light pulses of FIG. 13(b), into the optical fiber 2 under control of the control unit 20, in order to allow the light intensity measurement unit to obtain a plurality of light intensity data of Brillouin scattered light associated with the series of probe light pulses included in the second probe light; Ps(t2,0), Ps(t4,0), Ps(t6,0), . . . , as shown in FIG. 14(b). The light intensity measurement unit 5 samples the light intensity of the Brillouin scattered light at a sampling rate of 4 to 5 Ghz to generate a plurality of light intensity data. The computation unit computes the waveform of each pulse as shown in FIGS. 14(a) and 14(b) from the plurality of light intensity data sampled using a least squares method or the like, and then computes light intensity data, such as Ps($t_1$,0), from the waveform of each pulse. The other operation of the measurement device of the third embodiment is the same as that of the measurement device of the aforementioned second embodiment, and therefore the description of the other operation will be omitted hereinafter.

As previously mentioned, in accordance with the third embodiment of the present invention, two groups of small sections measured by two neighboring light pulses included in each discontinuous probe light beam are deviated from each other by two small sections. Accordingly, this results in preventing errors due to the interference of Brillouin scattered lightwaves produced in two neighboring small sections, which is a problem that comes from using a single pulse with a certain time duration as the probe light, thereby reducing errors that occur in the variables Qs(i) determined by the light intensity data measured at a time. The third embodiment of the present invention thus offers the advantage of being able to measure the strain that appears in each of the plurality of small sections in the object 1 to be measured using Brillouin scattered light with a higher degree of accuracy.

In accordance with the third embodiment of the present invention, the measurement device can measure the temperature each of the plurality of small sections z(i) in the object 1 to be measured by using a relationship between temperatures of the structure 1, which were measured in advance when there was no strain in the structure 1, and frequency shifts that occurred in Brillouin scattered light, instead of measuring the strain that appears in each of the plurality of small sections z(i) in the object 1 to be measured using Brillouin scattered light. As an alternative, the measurement device can measure the temperature of each of the plurality of small sections z(i) in the object 1 to be measured by using a relationship between temperatures of the structure 1 and light intensities of Raman scattered light.

In a variant, only one discontinuous probe light can be used for measuring a distribution of strain that appears in the measurement area, instead of using a set of two different discontinuous probe lightwaves as shown in FIGS. 13(b) and 13(c). However, in this case, the spatial resolution is reduced to one half that of the above-mentioned exemplary measurement device of the third embodiment. That is, the length of each of the plurality of small sections is two times as large as that of each of the plurality of small sections defined in the aforementioned third embodiment. In the variant, it is desirable that n is an even integer.

Fourth Embodiment

Referring next to FIGS. 15(a) to 15(d), there is illustrated a diagram showing the waveforms of discontinuous probe lightwaves for use with a measurement device according to a fourth embodiment of the present invention. As shown in FIGS. 15(a) to 15(d), like the aforementioned third embodiment, each discontinuous probe lightwave is comprised of a series of probe light pulses which can be obtained by dividing a single pulse having a certain duration or pulse width, in units (or intervals) of one predetermined time period Tp (which corresponds to the predetermined effective sampling period Ts according to the aforementioned second embodiment), which corresponds to two times the length of each of a plurality of small sections z(i), as shown in FIG. 6(a), into which a measurement area of the optical fiber 2 is divided. Unlike the aforementioned third embodiment, however, each discontinuous probe lightwave does not necessarily have a fixed pulse repetition period 2 Tp, and corresponds to a certain code. That is, each discontinuous probe lightwave is comprised of a series of light pulses corresponding to a predetermined code and having a pulse repetition period that is not necessarily constant. The first discontinuous probe light as shown in FIG. 15(a) can be represented as a code "10001000 . . ." when each light pulse with a time duration Tp is represented as "1" and each interval Tp during which there exists no light pulse is represented as "0". The first discontinuous probe light has a constant pulse repetition period 4 Tp. The second discontinuous probe light as shown in FIG. 15(b) can be represented as a certain code "01000010 . . . ", and has an inconstant pulse repetition period. The third discontinuous probe light as shown in FIG. 15(c) can be represented as a certain code "00100100 . . . ", and has an inconstant pulse repetition period. The fourth discontinuous probe light as shown in FIG. 15(d) can be represented as a certain code "00010001 . . . ", and has a constant pulse repetition period 4 Tp. Superimposing the set of four discontinuous probe lightwaves as shown in FIGS. 15(a) to 15(d) yields a code "11111111 . . . " with all bits set to 1 (each pulse or interval with a time duration Tp is referred to as "bit"). The measurement device according to the fourth embodiment of the present invention thus measures a distribution of strain that appears in a predetermined area by using the four different discontinuous probe lightwaves, as shown in FIGS. 15(a) to 15(d), which corresponds to the four predetermined codes. The number of the discontinuous probe lightwaves included in the set is not limited to four, and the set can be comprised of two or more discontinuous probe lightwaves each including any series of pulses, provided that they can be easily distinguished from each other. In addition, in order to prevent errors due to the interference of Brillouin scattered lightwaves associated with two neighboring small sections, which is a problem that comes from using a single pulse with a certain time duration or pulse width as the probe light, it is preferable that each predetermined code is set so that it does not partially include "11". However, each predetermined code defining each discontinuous probe lightwave can partially include at least a series of two or more is, such as "11", because errors due to the interference of Brillouin scattered lightwaves associated with two neighboring small sections can be reduced. The other structure of the measurement device according to the fourth embodiment of the present invention is the same as that of the measurement device of the aforementioned third embodiment, and therefore the description of the other structure will be omitted hereinafter.

The following equation (10) shows a matrix operation used for computing scattering gain coefficients in the gain coefficient computation step ST11 according to the fourth embodiment.

Figure 16A:
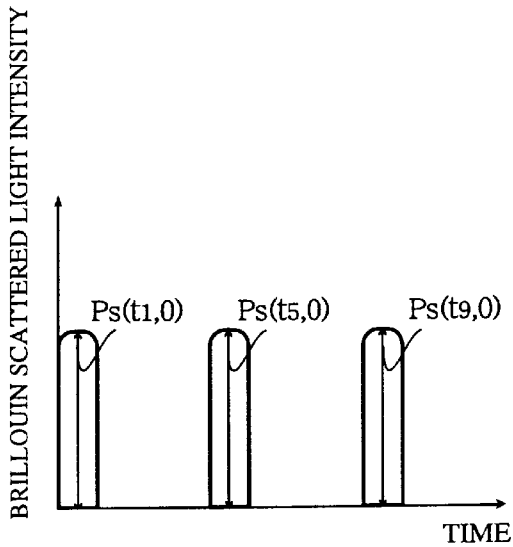
FIGS. 16(a) to 16(d) are diagrams each showing the light intensity of Brillouin scattered light measured by a light intensity measurement unit of the measurement device according to the fourth embodiment of the present invention.
Figure 16B:
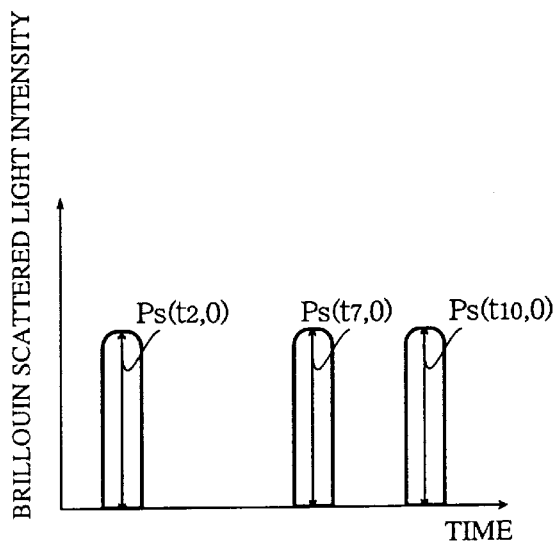
Figure 16C:
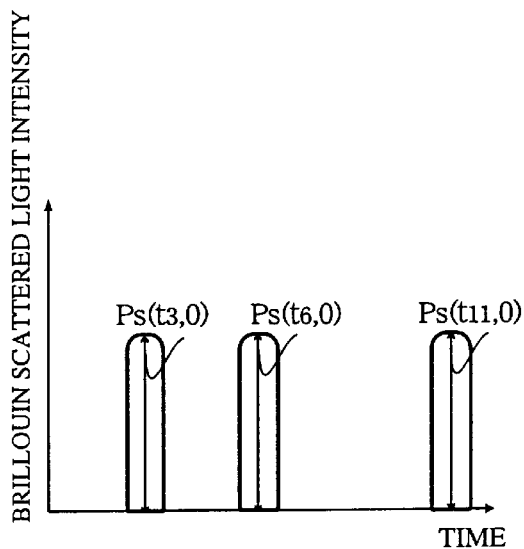
Figure 16D:
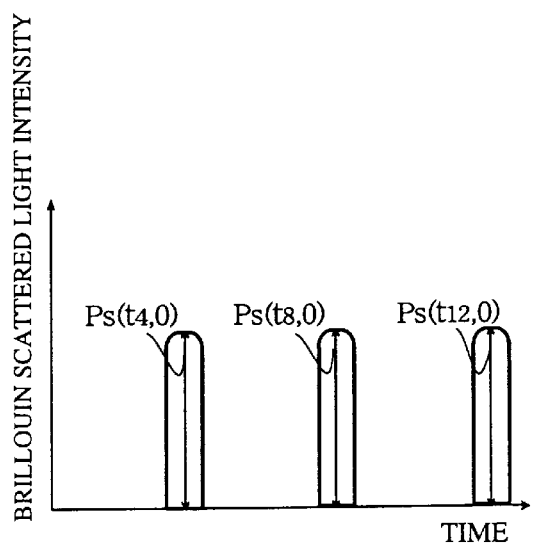

FIG. 15 (a), which corresponds to the predetermined code "10001000 . . . ", into the optical fiber 2 under control of the control unit 20, first. As shown in the equation (10), a series of small sections which contributes to Brillouin scattered light associated with each probe light pulse included in the first discontinuous probe light is the one which is shifted from another series of small sections which contributes to Brillouin scattered light associated with either of the previous or next probe light pulse included in the same discontinuous probe light by four small sections. For example, if a series of small sections measured by one light pulse is a group of z(i), z(i+1), . . . , z(i+n−1), another series of small sections measured by the next light pulse is a group of z(i+4), z(i+5), . . . , z(i+n+3). As a result, variables Qs(1), Qs(5), Qs(9), . . . can be computed from a plurality of light intensity data of Brillouin scattered light produced by the series of probe light pulses included in the first probe light; Ps(t1,0), Ps(t5,0) Ps(t9,0), . . . , as shown in FIG. 16(a). In order to obtain variables Qs(2) to Qs(4), Qs(6) to Qs (8), . . . , the probe light source 4 further injects the second probe light with the same frequency vs, including the series of probe light pulses which corresponds to the predetermined code "0100010 . . . " for example, into the optical fiber 2 under control of the control unit 20, in order to allow the light intensity measurement unit to obtain a plurality of light intensity data of the Brillouin scattered light associated with the series of probe light pulses included in the second probe light; Ps(t2,0), Ps(t7,0), Ps(t10,0), . . . , as shown in FIG. 16(b). The probe light source 4 further injects the third probe light with the same frequency vs, including the series of probe light pulses which corresponds to the predetermined code "00100100 . . . " for example, into the optical fiber, in order to allow the light intensity measurement unit to obtain a plurality of light intensity data of the Brillouin scattered light associated with the series of probe light pulses included in the third probe light; Ps(t3,0), Ps(t6,0), Ps(t11,0), . . . , as shown in FIG. 16(c). Finally, the probe light source 4 injects the fourth probe light with the same frequency vs, including the series of probe light pulses which corresponds to the predetermined code "00010001 . . . " for example, into the optical fiber, in order to allow the light intensity measure- $$\begin{pmatrix} a(1,1) & & & & & & \cdots & & a(1,n) & 0 & 0 & 0 & 0 & 0 & 0 & \cdots & 0 \\ 0 & 0 & 0 & 0 & a(5,5) & & & \cdots & & a(5,n+4) & 0 & \cdots & 0 \\ \vdots & & \ddots & & & \ddots & & & & \ddots & & \vdots \\ 0 & & \cdots & & 0 & a(m-3,m-3) & & \cdots & & a(m-3,m+n-4) & 0 & 0 & 0 \\ 0 & a(2,2) & & & & & \cdots & & a(2,n+1) & 0 & 0 & 0 & 0 & 0 & \cdots & 0 \\ 0 & 0 & 0 & 0 & 0 & a(6,6) & & \cdots & & a(6,n+5) & 0 & \cdots & 0 \\ \vdots & & & \ddots & & & \ddots & & & & \ddots & & \vdots \\ 0 & & & \cdots & & 0 & a(m-2,m-2) & & \cdots & & a(m-2,m+n-3) & 0 & 0 \\ 0 & 0 & a(3,3) & & & & & \cdots & & a(3,n+2) & 0 & 0 & 0 & 0 & 0 & \cdots & 0 \\ 0 & 0 & 0 & 0 & 0 & 0 & a(7,7) & & \cdots & & a(7,n+6) & 0 & \cdots & 0 \\ \vdots & & & & \ddots & & & \ddots & & & & \ddots & & \vdots \\ 0 & & & \cdots & & & 0 & 0 & a(m-1,m-1) & & \cdots & & a(m-1,m+n-2) & 0 \\ 0 & 0 & 0 & a(4,4) & & & & & \cdots & & a(4,n+3) & 0 & 0 & 0 & 0 \cdots 0 \\ 0 & 0 & 0 & 0 & 0 & 0 & 0 & a(8,8) & & \cdots & & a(8,n+7) & 0 \cdots 0 \\ \vdots & & & & & \ddots & \ddots & & & & \ddots & & \vdots \\ 0 & & & \cdots & & & 0 & 0 & 0 & a(m,m) & & & & a(m,m+n-1) \end{pmatrix} \begin{pmatrix} gs(1) \\ gs(2) \\ \vdots \\ \vdots \\ gs(m) \\ \vdots \\ gs(m+n-1) \end{pmatrix} = \begin{pmatrix} Qs(1,1) \\ Qs(1,5) \\ \vdots \\ Qs(1,m-3) \\ Qs(2,2) \\ Qs(2,6) \\ \vdots \\ Qs(2,m-2) \\ Qs(3,3) \\ \vdots \\ Qs(3,m-1) \\ Qs(4,4) \\ \vdots \\ Qs(4,m) \end{pmatrix} \quad (10)$$

where m is an even integer. In order to measure a distribution of strain that appears in the measurement area in the optical fiber 2, the probe light source 4 injects the first discontinuous probe light including a series of light pulses, as shown in ment unit to obtain a plurality of light intensity data of the Brillouin scattered light associated with the series of probe light pulses included in the fourth probe light; Ps(t4,0) Ps(t8,0), Ps(t12,0), . . . , as shown in FIG. 16(d). The other operation of the measurement device of the fourth embodiment is the same as that of the measurement device of the aforementioned third embodiment, and therefore the description of the other operation will be omitted hereinafter.

As previously mentioned, the code patterns are not limited to those as shown in FIGS. 15(a) to 15(d). The plurality of code patterns can be determined in such a manner that the summation of them yields a bit pattern with all bits set to 1 so that the m variables Qs(1) to Qs(m) determined by the m light intensity data measured for every set frequency vs of the probe light can be provided. In addition, in order to prevent errors due to the interference of Brillouin scattered lightwaves associated with two neighboring small sections, which is a problem that comes from using a single pulse with a certain time duration or pulse width as the probe light, it is preferable that each predetermined code is set so that it does not partially include "11". However, each predetermined code defining each discontinuous probe lightwave can partially include at least a series of two or more 1s, such as "11", because errors due to the interference of Brillouin scattered lightwaves associated with two neighboring small sections can be corrected.

Figure 17:
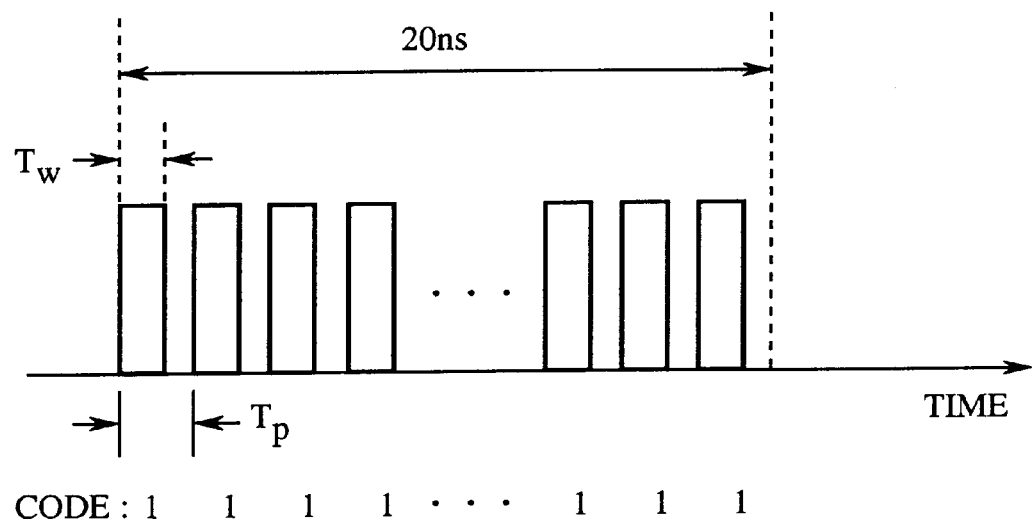
FIG. 17 is a diagram showing the waveform of discontinuous probe light for use with a measurement device according to a variant of the fourth embodiment of the present invention.

Referring next to FIG. 17, there is illustrated a diagram showing the waveform of discontinuous probe light for use with a measurement device according to a variant of the fourth embodiment shown. The discontinuous probe light of the variant is comprised of a series of light pulses having a fixed pulse repetition period Tp and each having a pulse with Tw. The series of light pulses as shown in FIG. 17 corresponds to a code "11111111 . . . " with all bits set to 1. The discontinuous probe light as shown in FIG. 17 can be injected into the optical fiber 2 at a time. As an alternative, the series of probe light pulses can be divided two or more series of light pulses and they can be injected in turn into the optical fiber 2, as previously mentioned. In this variant, Tp has to be 0.5 nsec in order to provide the same spatial resolution of 5 cm as that provided by the aforementioned fourth embodiment. In this case, the light intensity measurement unit 5 has to sample the light intensity of Brillouin scattered light at a sampling rate of 8 Ghz or more.

As previously mentioned, in accordance with the fourth embodiment of the present invention, the measurement device can easily bring a series of light intensity data of Brillouin scattered light associated with a series of light pulses included in one discontinuous probe lightwave into correspondence with a certain code, as shown in FIGS. 16(a) to 16(d). Accordingly, this results in making it possible to easily determine which series of small sections is associated with each of the plurality of light intensity data. That is, the measurement device can easily determine which zone within the measurement area of the optical fiber is associated with each variable determined by the corresponding light intensity data of the Brillouin scattered light associated with a series of small sections measured by each probe light pulse. Accordingly, even though the order of storing light intensity data sampled is random, the measurement device makes it easy to manage and use each variable Qs(i) determined by the light intensity data of the Brillouin scattered light associated with a certain series of small sections. The measurement device of the fourth embodiment of the present invention can thus measure the strain that appears in each of the plurality of small sections in the object 1 to be measured using Brillouin scattered light with a higher degree of accuracy.

In accordance with the fourth embodiment of the present invention, the measurement device can measure the temperature of each of the plurality of small sections z(i) in the object 1 to be measured by using a relationship between temperatures of the structure 1, which were measured in advance when there was no strain in the structure 1, and frequency shifts that occurred in Brillouin scattered light, instead of measuring the strain that appears in each of the plurality of small sections z(i) in the object 1 to be measured using Brillouin scattered light. As an alternative, the measurement device can measure the temperature of each of the plurality of small sections z(i) in the object 1 to be measured by using a relationship between temperatures of the structure 1 and light intensities of Raman scattered light.

Fifth Embodiment

Figure 18:
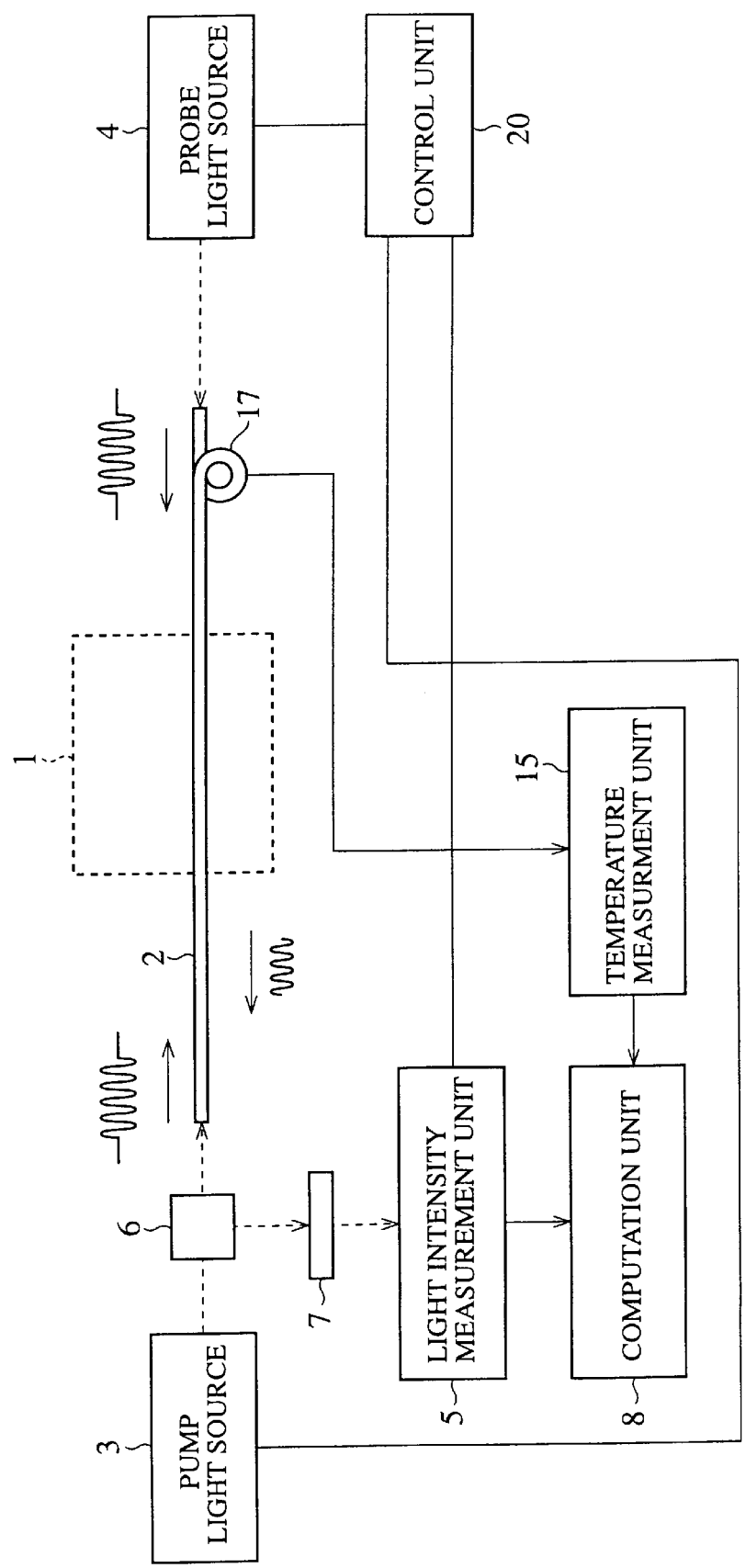
FIG. 18 is a block diagram showing the structure of a measurement device according to a fifth embodiment of the present invention.

Referring next to FIG. 18, there is illustrated a block diagram showing the structure of a measurement device according to a fifth embodiment of the present invention. In the figure, reference numeral 17 denotes a reference fiber portion that is a part of the optical fiber not secured to the object 1 to be measured, 15 denotes a temperature measurement unit for measuring the temperature of the reference fiber portion 17, and for furnishing temperature information indicating the temperature measured to the computation unit 8. It can be assumed that no strain appears in the reference fiber portion 17 because it is not secured to the object 1 to be measured. The other structure of the measurement device of the fifth embodiment of the present invention is the same as that of the measurement device of either one of the aforementioned second to fourth embodiments, and therefore the description of the other structure will be omitted hereinafter.

Figure 19:
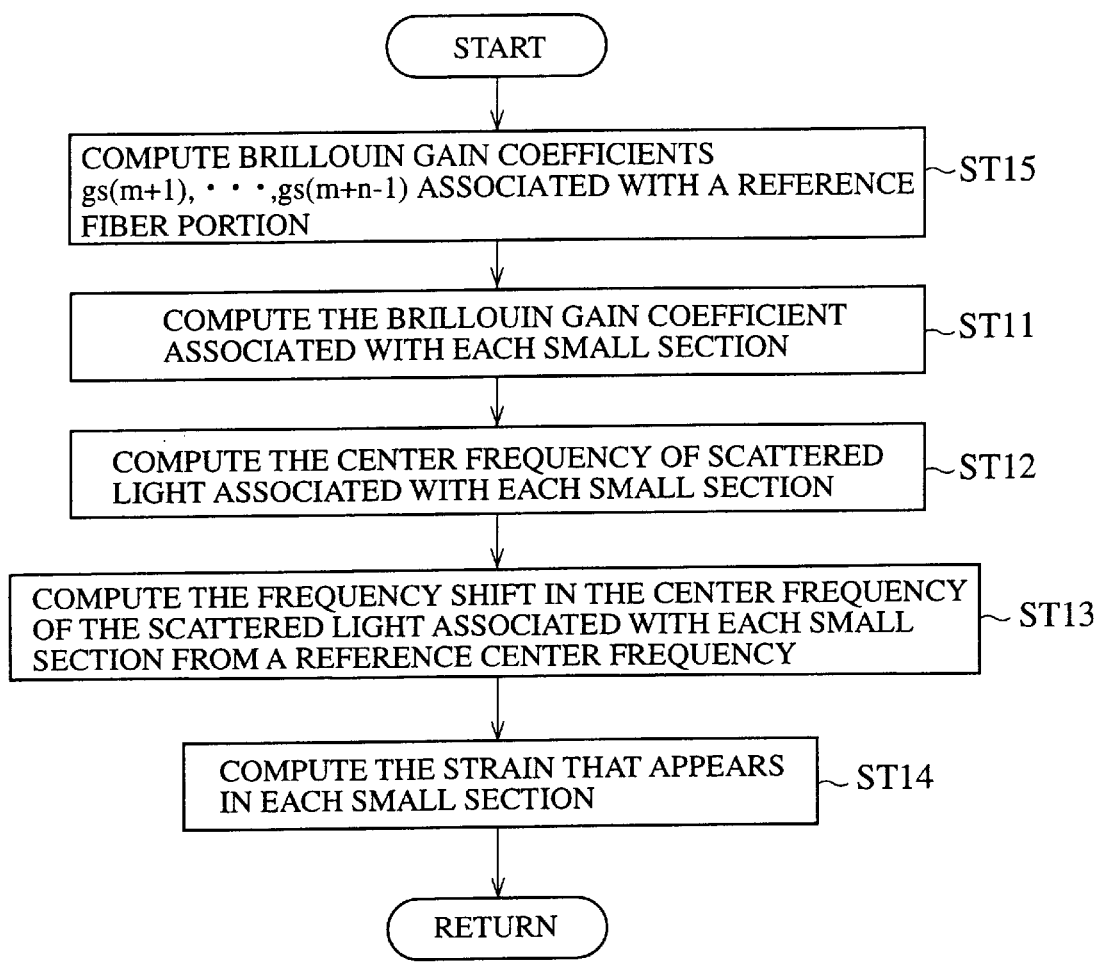
FIG. 19 is a flow chart showing detailed procedures of a computation step, according to the fifth embodiment of the present invention.

Referring next to FIG. 19, there is illustrated a flow chart showing procedures of the computation process performed in step ST27, as shown in FIG. 7, according to the fifth embodiment of the present invention. In the figure, ST15 denotes a reference fiber gain coefficient computation step in which the computation unit 8 computes the scattering gain coefficients gs(m+1), . . . , gs(M+n−1)) associated with the reference fiber portion 17, which is a part corresponding to a series of z(m), . . . , z(M+n−1) as shown in FIG. 6(a), based on the temperature information from the temperature measurement unit 15. The reference fiber portion 17 can be a part corresponding to a series of z(1), . . . , z(n−1). In this case, in the reference fiber gain coefficient computation step 15, the scattering gain coefficients gs(1), . . . , gs(n−1) are computed for the reference fiber portion 17. The other operation of the measurement device of the fifth embodiment of the present invention is the same as that of the measurement device of either of the aforementioned second to fourth embodiments.

Figure 20:
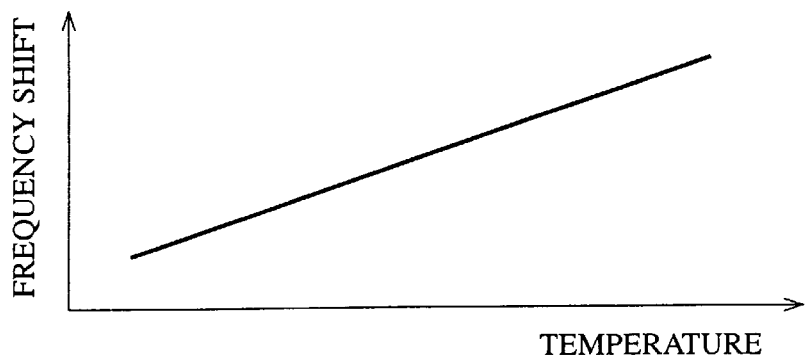
FIG. 20 is a diagram showing a relationship between temperatures of the optical fiber and frequency shifts that occur in Brillouin scattered light.

Referring next to FIG. 20, there is illustrated a diagram showing a relationship between temperatures of the optical fiber 2 and frequency shifts that occur in the Brillouin scattered light. In the figure, the horizontal axis shows the temperatures, and the vertical axis shows the frequency shifts. In performing the reference fiber gain coefficient computation step ST15, the reference center frequency of Brillouin scattered light measured at a reference temperature is corrected according to the difference between the temperature measured and the reference temperature.

As mentioned above, in accordance with the fifth embodiment of the present invention, the measurement device can correct the scattering gain coefficients gs(m+1), . . . , gs(M+n−1) according to the temperature of the reference fiber portion 17 measured by the temperature measurement unit 15. Accordingly, the fifth embodiment of the present invention offers the advantage of being able to reduce errors that occur in the scattering gain coefficient gs(i) (i=1, . . . , m) of the scattered light associated with each of the plurality of small sections, which can be computed by using the scattering gain coefficients obtained for the reference fiber portion 17.

In a variant of the fifth embodiment, two or more reference fiber portions 17 can be provided. Especially, when two reference fiber portions 17 are disposed on both sides of the object 1 to be measured with the reference fiber portions being adjacent to both ends of the object, respectively, one end of a series of small sections defined in each of the reference fiber portions is adjacent to one end of the plurality of small sections defined in the object 1, and therefore the scattering gain coefficient of the scattered light associated with each of the plurality of small sections in the object can be computed with the highest degree of efficiency because further measurement and computation are not needed for extra small sections that can exist between the reference fiber portions and the object 1 when the reference fiber portions and the object are separated from each other.

Sixth Embodiment

A measurement device according to a sixth embodiment of the present invention computes the strain that appears in each of the plurality of small sections and the temperature of each of the plurality of small sections, based on both a frequency shift and either one of a power shift and a variation in the scattering gain coefficient. The other structure of the measurement device of the sixth embodiment of the present invention is the same as that of the measurement device of the aforementioned fifth embodiment, and therefore the description of the other structure will be omitted hereinafter.

Figure 21:
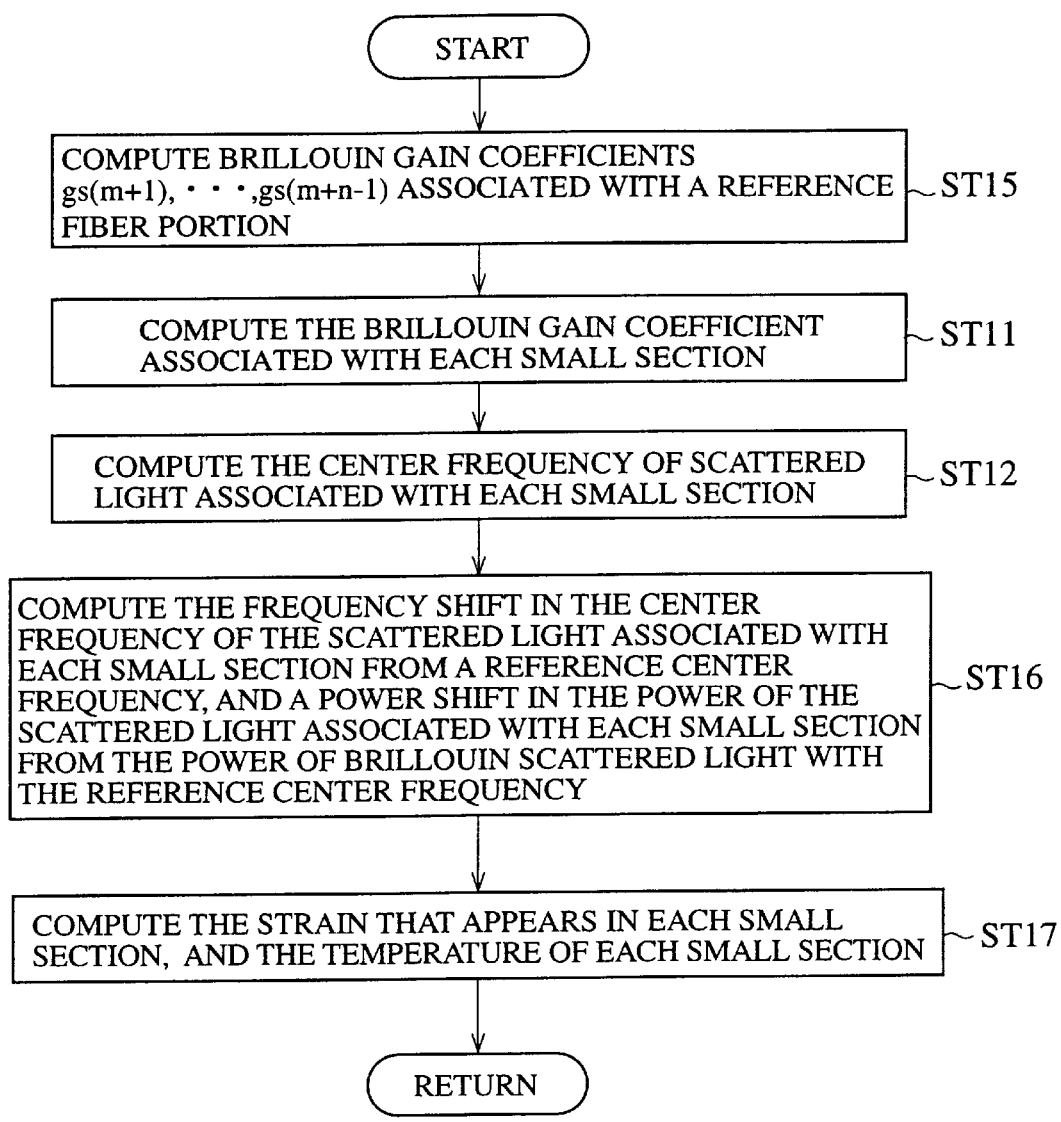
FIG. 21 is a flow chart showing detailed procedures of a computation process, according to a sixth embodiment of the present invention.

Referring next to FIG. 21, there is illustrated a flow chart showing procedures of a computation process performed in step ST27, as shown in FIG. 7, according to the sixth embodiment of the present invention. In the figure, ST16 denotes a frequency and power shifts computation step in which the computation unit 8 computes a frequency shift in the center frequency of the Brillouin scattered light associated with each of the plurality of small sections from a reference center frequency which is the center frequency of Brillouin scattered light associated with the optical fiber 2 which was measured in advance when there was no strain that appeared in the optical fiber, and either a power shift in the light intensity of the Brillouin scattered light associated with each of the plurality of small sections from a reference power of Brillouin scattered light with the reference center frequency associated with the optical fiber 2, which was measured in advance when there was no strain that appeared in the optical fiber, or a gain coefficient variation in the scattering gain coefficient of the Brillouin scattered light associated with each of the plurality of small sections from a reference scattering gain coefficient of Brillouin scattered light with the reference center frequency associated with the optical fiber 2, which was measured in advance when there was no strain that appeared in the optical fiber, and ST17 denotes a strain/temperature computation step in which the computation unit 8 computes the temperature of each of the plurality of small sections as well as the strain that appears in each of the plurality of small sections. The other operation of the measurement device of the sixth embodiment of the present invention is the same as that of the measurement device of the aforementioned fifth embodiment, and therefore the description of the other operation will be omitted hereinafter.

Figure 22:
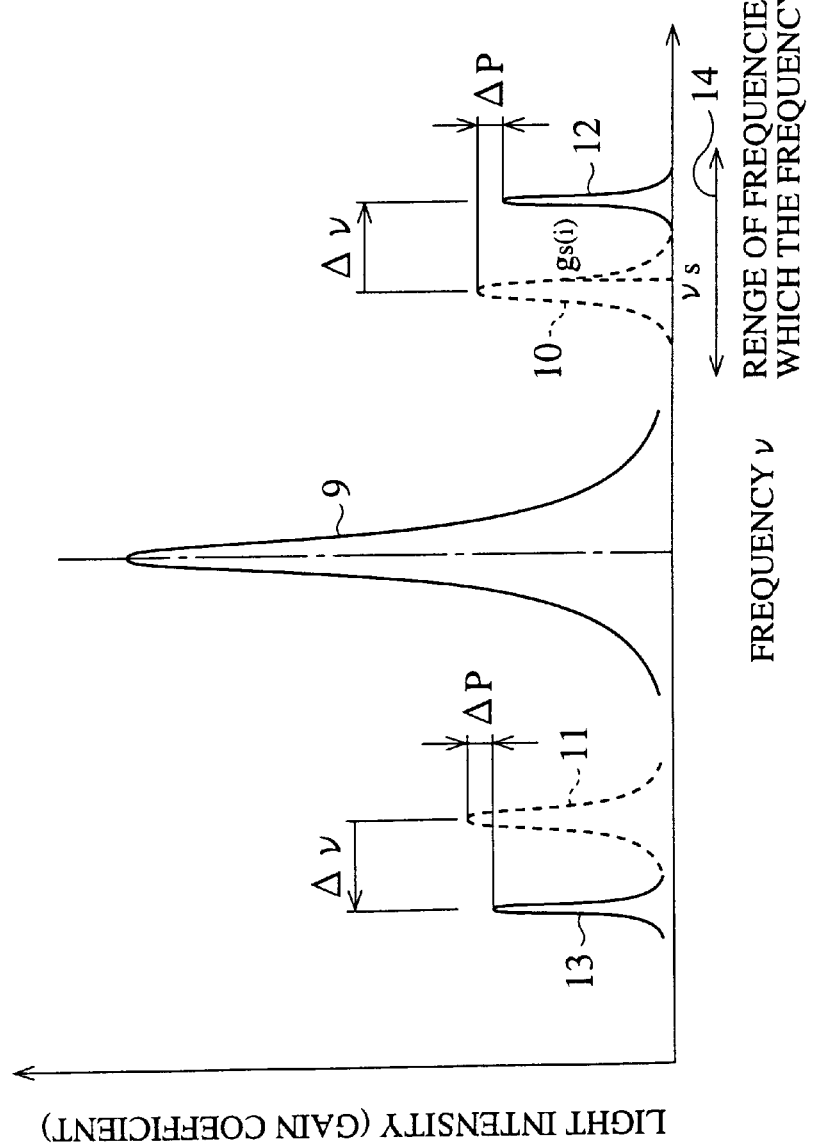
FIG. 22 is a graph showing an example of a spectrum of the light intensity of the Brillouin scattered light associated with each of the plurality of small sections.

Referring next to FIG. 22, there is illustrated a spectrum of the light intensity of the Brillouin scattered light associated with each of the plurality of small sections, i.e., z(i). In the figure, $\Delta v$ shows a frequency shift, $\Delta Ps$ shows a power shift or a variation in the scattering gain coefficient. Parts of the spectrum indicated by the other reference numerals are the same as those as shown in FIG. 3, the description of the parts of the spectrum will be omitted hereinafter.

The following equation (11) shows a matrix operation used for computing a strain change $\Delta \epsilon$ that appears in each of the plurality of small sections, i.e. z(i), and the temperature $\Delta T$ of each of the plurality of small sections, based on the frequency shift $\Delta v$ and the power shift or gain coefficient variation $\Delta Ps$.

$$\begin{pmatrix} \Delta v \\ \frac{\Delta Ps}{P_{(R)}} \end{pmatrix} = \begin{pmatrix} C_{\epsilon v} & C_{Tv} \\ C_{\epsilon P} & C_{TP} \end{pmatrix} \begin{pmatrix} \Delta \epsilon \\ \Delta T \end{pmatrix} \quad (11)$$

where P(R) is a light intensity of Rayleigh scattered light or the light intensity of the pump light, $C_{\epsilon v}$, $C_{\epsilon p}$, $C_{Tv}$, and $C_{tp}$ are constants of the optical fiber 2.

As previously mentioned, in accordance with the sixth embodiment of the present invention, the computation unit 8 of the measurement device computes the strain that appears in each of the plurality of small sections and the temperature of each of the plurality of small sections, based on both a frequency shift and either one of a power shift and a variation in the scattering gain coefficient. Accordingly, the sixth embodiment of the present invention offers the advantage of being able to simultaneously measure the strain that appears in each of the plurality of small sections and temperature of each of the plurality of small sections using the Brillouin scattered light.

Seventh Embodiment

Figure 23:
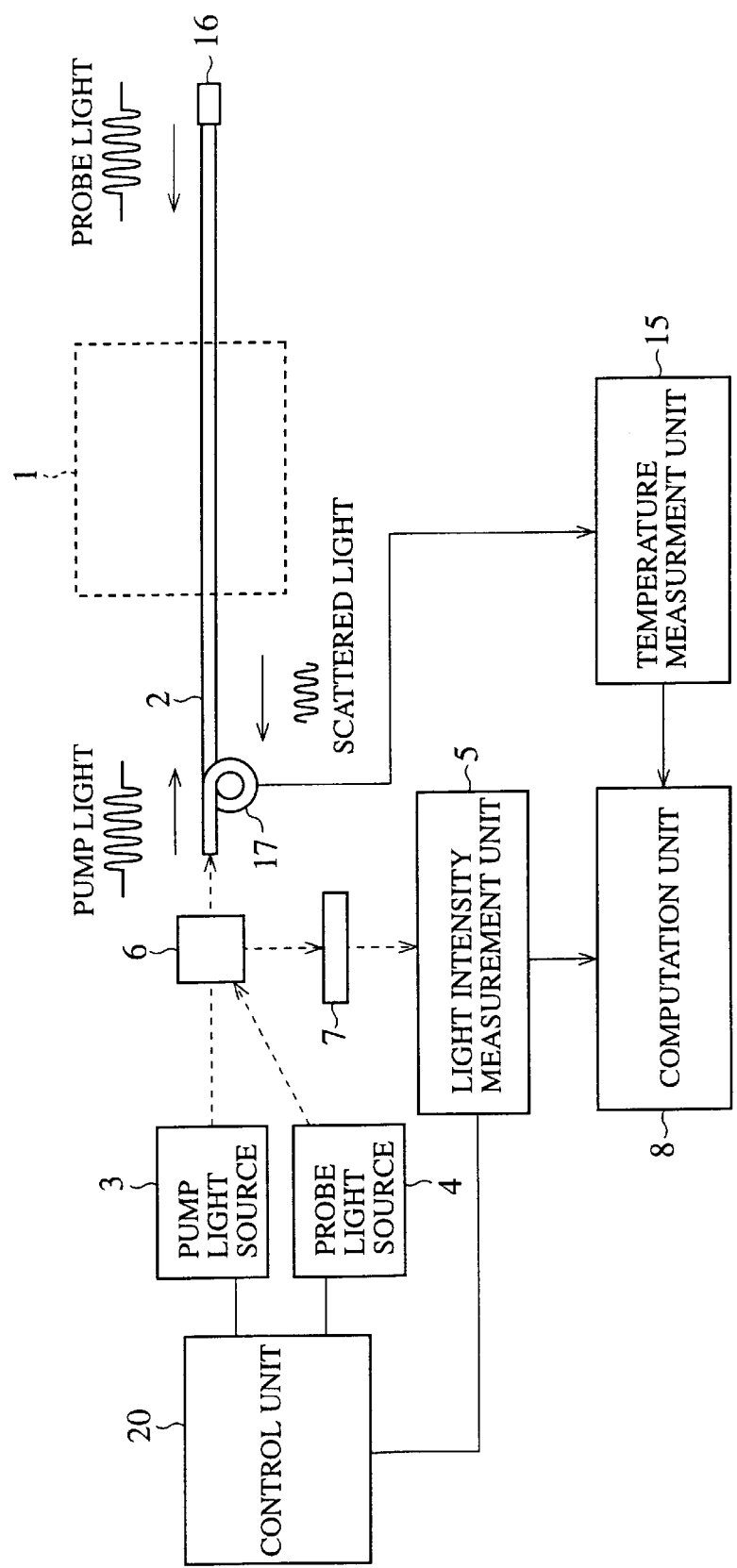
FIG. 23 is a block diagram showing the structure of a measurement device according to a seventh embodiment of the present invention.

Referring next to FIG. 23, there is illustrated a block diagram showing the structure of a measurement device according to a seventh embodiment of the present invention. In the figure, reference numeral 16 denotes a reflection member located at one end of the optical fiber 2. Since a free end of the optical fiber 2 can take the place of the reflection member 16, the reflection member 16 can be removed. The other structure of the measurement device according to the seventh embodiment is the same as that of the measurement device of either of the aforementioned first to sixth embodiments, and therefore the description of the other structure will be omitted hereinafter. In the seventh embodiment, it is preferable that the reference fiber portion 17 is a series of small sections z(1) to z(n−1), as shown in FIG. 23.

Next, a description will be made as to the difference between the operation of the measurement device of the seventh embodiment and that of the measurement device of either of the first to sixth embodiments, with reference to FIG. 2. After the probe light source 4, in step ST2, emits and injects discontinuous probe light into one end of the optical fiber 2 under control of the control unit 20, the pump light source 3, in step ST3, emits and injects discontinuous pump light into the first end of the optical fiber 2 under control of the control unit 20 so that the probe light reflected off the reflection member 16 and the pump light collide with each other at an end of a predetermined zone set in this step, which is located on the side of the reflection member 16, within a measurement area of the optical fiber 2 secured to the structure 1. After that, the steps ST4 to ST6 are carried out, like the measurement device of either of the aforementioned first to sixth embodiments.

Like the second embodiment, the computation unit 8 can compute the variable Qs(i) according to the following equation (12), before computing the scattering gain coefficient gs(i) of the scattered light associated with each of the plurality of small sections z(i) (i=n, ..., M+n−1) according to the gain computation matrix equation.

$$Qs(i) = \ln\left\{\frac{Ps(t, 0)}{Ps\left(t - \frac{2L}{c}, 0\right)}\right\} + 2\alpha sL + R \qquad (12)$$

where Ps(t,0) is the actually-measured light intensity of Brillouin scattered light or probe light at Z=0 measured at time t, Ps(t−2L/c,0) is the actually-measured light intensity of the probe light at Z=0 measured at time (t−2L/c), αs is an attenuation coefficient of the probe light, L is the total length of the optical fiber 2, c is the light speed of the discontinuous probe light in the optical fiber 2, and R is a reflection loss of the reflection member 16.

Then, according to the seventh embodiment, substituting a value computed according to the above-mentioned equation (12) to the variable Qs(i), a value computed according to the above-mentioned equation (8) to the contribution factor a(i,j), and values computed based on the temperature of the reference fiber portion 17 measured by the temperature measurement unit 15 to the scattering gain coefficients gs(1) to gs(n−1) associated with the reference fiber portion 17 in a gain computation matrix equation similar to the aforementioned equation (5) yields the scattering gain coefficient gs(i) of the scattered light associated with each of the plurality of small sections z(i) (i=n, ..., M+n−1).

As previously mentioned, in accordance with the seventh embodiment of the present invention, the provision of the reflection member 16 for reflecting light incident thereon at one end of the optical fiber makes it possible to measure scattered light by injecting both the pump light from the pump light source 3 and the probe light from the probe light source 4 into another end of the optical fiber 2. In particular, even though the optical fiber 2 has a long length, the measurement device of the seventh embodiment can carry out the strain and/or temperature measurement.

Eighth Embodiment

Figure 24:
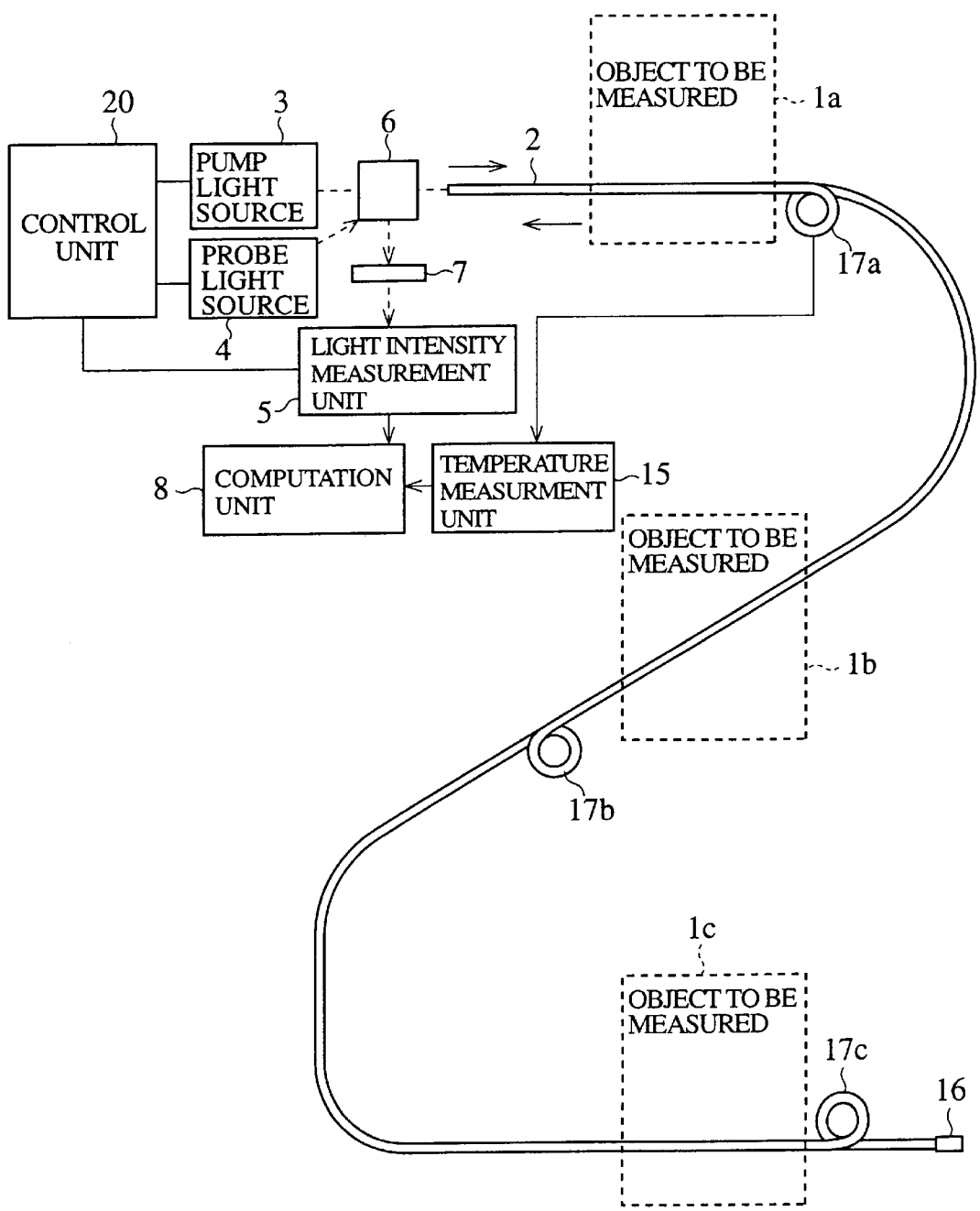
FIG. 24 is a block diagram showing the structure of a measurement device according to an eighth embodiment of the present invention.
Figure 25:
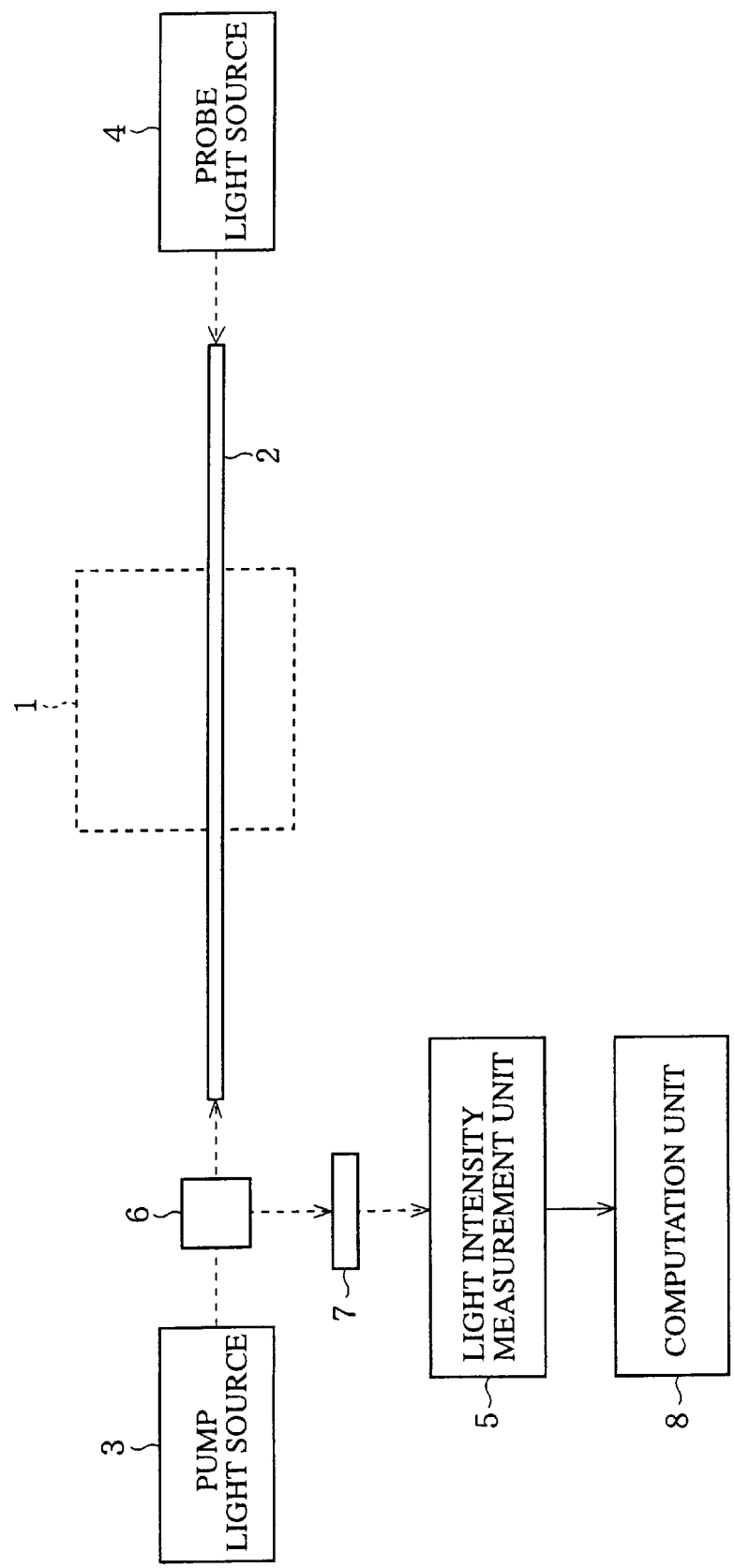
FIG. 25 is a block diagram showing the structure of a prior art measurement device for measuring the strain that appears in an object to be measured and/or temperature of the object to be measured.

Referring next to FIG. 24, there is illustrated a block diagram showing the structure of a measurement device according to an eighth embodiment of the present invention. In the figure, reference numerals 1a to 1c denote objects to be measured, which are disposed separately with respect to the optical fiber 2. The optical fiber 2 is partially secured to each of the objects to be measured. Further, reference numerals 17a to 17c denote reference fiber portions which are not secured to the plurality of objects 1a to 1c, respectively, and where there is no strain, 15 denotes a temperature measurement unit for measuring the temperature of the first reference fiber portion 17a. The other structure of the measurement device of the eighth embodiment is the same as that of the measurement device of the aforementioned seventh embodiment, and therefore the description of the other structure will be omitted hereinafter.

The measurement device can measure the strain that appears in each of a plurality of small sections within each of a plurality of measurement areas which are disposed in the optical fiber, respectively, and which are partially secured to the plurality of objects 1a to 1c, respectively. In order to carry out a measurement on the plurality of objects 1a to 1c at a time, the measurement device measures the light intensity of scattered light associated with the length of the optical fiber 2, measures the temperature of the first reference fiber portion 17a by means of the temperature measurement unit 15, computes a frequency shift in the scatted light associated with each of the plurality of small sections and a variation in the scattering gain coefficient of the scattered light associated with each of the plurality of small sections in succession, starting from the first reference fiber portion 17a whose temperature has been measured, by means of the computation unit 8, and then computes the strain that appears in each of the plurality of small sections and the temperature of each of the plurality of small sections, based on the frequency shift and scattering gain coefficient variation computed.

In order to carry out a measurement on one of the plurality of objects to be measured or carry out a measurement on each of the plurality of objects to be measured at different times, the measurement device measures the light intensity of scattered light associated with a plurality of small sections defined in the selected object to be measured and a zone extending from the object to one reference fiber portion which is adjacent to the object, measures the temperature of the reference fiber portion by means of the temperature measurement unit 15, computes a frequency shift in the scattered light associated with each of the plurality of small sections and a variation in the scattering gain coefficient of the scattered light associated with each of the plurality of small sections in succession, starting from the reference fiber portion whose temperature has been measured by means of the computation unit 8, and then computes the strain that appears in each of the plurality of small sections and the temperature of each of the plurality of small sections, based on the frequency shift and gain coefficient variation computed. As can be seen from the computation procedures, arranging the respective fiber portions 17a to 17c in the vicinity of the respective objects 1a to 1c to be measured makes it possible to measure a distribution of strain that appears in each of the plurality of objects and a distribution of temperature of each of the plurality of objects with the highest degree of efficiency. A plurality of temperature measurement units can be provided for the plurality of reference fiber portions 17a to 17c, respectively.

As previously mentioned, in accordance with the eighth embodiment of the present invention, the measurement device can carry out a measurement on either all of the plurality of objects 1a to 1c to be measured or each of the plurality of objects 1a to 1c to be measured by making effective use of the length of the optical fiber 2 because the optical fiber 2 is partially secured to each of the plurality of objects 1a to 1c to be measured. In addition, since the measurement device can measure the temperature of each of the reference fiber portions 17a to 17c, and correct the scattering gain coefficients gs(m+1) to gs(M+n−1) associated with each of the reference fiber portions 17a to 17cfor each of the plurality of objects 1a to 1c to be measured based on the temperature measured, the measurement device can obtain a distribution of strain and/or a distribution of temperature with a higher degree of accuracy, as compared with a case where a distribution of strain and/or a distribution of temperature are computed based on scattering gain coefficients computed from only the light intensity data of the Brillouin scattered light measured.

In a variant of the eighth embodiment, each of the plurality of objects 1a to 1c to be measured can be divided into a plurality of measurement sections. A reference fiber portion can be provided for each of the plurality of measurement sections, thus making it possible to carry out a measurement on each of the plurality of measurement sections defined in each of the plurality of objects to be measured.

Many widely different embodiments of the present invention may be constructed without departing from the spirit and scope of the present invention. It should be understood that the present invention is not limited to the specific embodiments described in the specification, except as defined in the appended claims.

What is claimed is:

1. A measurement apparatus for measuring at least one of strain and temperature, of an object, said apparatus comprising:
- an optical fiber secured to an object, said optical fiber having first and second ends;
- pulsed pump light source means for injecting pulsed pump light into the first end of said optical fiber;
- pulsed probe light source means for injecting pulsed probe light into the second end of said optical fiber;
- control means operatively connected to said pulsed pump light source means and said pulsed probe light source means for setting the pulsed probe light to a frequency vs and for scanning the pulsed probe light over a range of frequencies;
- light intensity measurement means for measuring intensity of output light emitted from the first end of said optical fiber;
- filter means located in an optical path from the first end of said optical fiber to said light intensity measurement means, for selectively transmitting scattered light included in the output light; and
- computation means operatively connected to said light intensity measurement means for computing at least one of strain and temperature of a zone of the object within a measurement area of said optical fiber from the scattered light reaching by said light intensity measurement means.

2. The measurement apparatus according to claim 1, wherein said computation means computes the variable Qs(i) in consideration of attenuation of the pulsed probe light in said optical fiber according to $$Qs(i) = \ln\left\{\frac{Ps(t, 0)}{Ps\left(t - \frac{L}{c}, L\right)}\right\} + \alpha_s L$$

where Ps(t,0) is the light intensity of scattered light at the first end of said optical fiber measured at time t by said light intensity measurement means, Ps(t−L/c,L) is the light intensity of the pulsed probe light at the second end of said optical fiber measured at time (t−L/c), αs is an attenuation coefficient of the pulsed probe light, L is the length of said optical fiber, and c is speed of the pulsed prone light in said optical fiber.

3. A measurement apparatus for measuring at least one of strain and temperature of an object, said apparatus comprising:
- an optical fiber secured to an object, said optical fiber having first and second ends;
- pulsed pump light source means for injecting pulsed pump light into the first end of said optical fiber;
- pulsed probe light source means for injecting pulsed probe light into the second end of said optical fiber;
- control means operatively connected to said pulsed pump light source means and said pulsed probe light source means for setting the pulsed probe light to a frequency vs and for scanning the pulsed probe light over a range of frequencies;
- light intensity measurement means for measuring intensity of output light emitted from the first end of said optical fiber, said light intensity measurement means sampling light intensity of the scattered light at time intervals of a fixed length corresponding to two times the length of each of a plurality of small sections of equal lengths into which the measurement area in said optical fiber is divided;
- filter means located in an optical path from the first end of said optical fiber to said light intensity measurement means, for selectively transmitting scattered light included in the output light; and
- computation means operatively connected to said light intensity measurement means for computing at least one of strain and temperature of each of said plurality of small sections of said measurement area of said optical fiber from the intensity of the scattered light measured by said light intensity measurement means, and wherein said measurement area in said optical fiber is divided into m small equal sections, said pulsed pump light source means injects pulsed pump light with a time duration equal to n-times the length of each of the time intervals, which corresponds to two times the length of each of the plurality of small sections, into said optical fiber, and said computation means computes a scattering gain coefficient of scattered light associated with each of the plurality of small sections based on light intensity of scattered light having a frequency equal to the frequency vs of the pulsed probe light, the light intensity of the scattered light being sampled at the time intervals by said light intensity measurement means, according to equation (1), $$\begin{pmatrix} a(1,1) & a(1,2) & \cdots & a(1,n) & 0 & \cdots & \cdots & \cdots & 0 \\ 0 & a(2,2) & a(2,3) & \cdots & a(2,n+1) & 0 & \cdots & \cdots & 0 \\ \vdots & & \ddots & & & & & & \vdots \\ 0 & \cdots & \cdots & a(i,i) & a(i,i+1) & \cdots & a(i,i+n-1) & 0 & \cdots & 0 \\ \vdots & & & & \ddots & & & & \vdots \\ 0 & \cdots & \cdots & \cdots & a(m,m) & a(m,m+1) & \cdots & \cdots & \cdots & a(m,m+n-1) \end{pmatrix} \quad (1)$$

-continued $$\begin{pmatrix} gs(1) \\ gs(2) \\ \vdots \\ gs(i) \\ \vdots \\ gs(m) \\ \vdots \\ gs(m+n-1) \end{pmatrix} = \begin{pmatrix} Qs(1) \\ Qs(2) \\ \vdots \\ Qs(i) \\ \vdots \\ Qs(m) \end{pmatrix}$$

where $Qs(i)(i=i, \ldots, m)$ is a variable determined by at least the light intensity of scattered light associated with i-th to (i+n−1)-th small sections numbered from one at a first end of the measurement area, and the light intensity of the pulsed probe light incident on said optical fiber, $gs(i)$ is the scattering gain coefficient of scattered light having a frequency equal to the frequency vs, associated with the i-th small section, and $a(i,j)$ is a contribution factor representing a ratio of the light intensity of scattered light associated with a j-th small section to $Qs(i)$, and wherein said computation means computes a frequency shift in the scattered light associated with each of the plurality of small sections based on scattering gain coefficients computed throughout the frequency range of the pulsed probe light, over which the frequency vs of the pulsed probe light has been scanned, to plurality of small sections based on the frequency shift computed, and/or light intensities of the scattered light associated with each of the plurality of small sections which have been obtained by scanning the frequency vs of the pulsed probe light.

4. The measurement apparatus according to claim 1, wherein said computation means computes the contribution factor $a(i,j)$ for each of the plurality of small sections according to $$a(i,j) = \frac{Pk(0)}{A} e^{-\alpha_p z} \cdot dz$$

where, assuming that the pulsed pump light is divided into n equal parts, $Pk(0)$ is light intensity of a k-th small pump light part Pk numbered from a first end of the pulsed pump light when the pulsed pump light is incident on the first end of said optical fiber, A is cross-sectional area of a core of said optical fiber, $\alpha_p$ is an attenuation coefficient of the pulsed pump light, z is distance from the first end of said optical fiber to a specified small section, and dz is the length of each of the plurality of small sections.

5. The measurement apparatus according to claim 3, further comprising temperature measurement means for measuring temperature of a reference fiber portion associated with the scattering gain coefficients $gs(m+1)$ to $gs(m+n-1)$ (or $gs(1)$ to $gs(n-1)$), which is a part of said optical fiber not secured to the object, wherein said computation means computes the scattering gain coefficients $gs(m+1)$ to $gs(M+n-1)$ based on the temperature measured and computes the scattering gain coefficient associated with each of the plurality of small sections, according to the equation (1).

6. The measurement apparatus according to claim 3, wherein said optical fiber is partially secured to at least one object.

7. The measurement apparatus according to claim 3, wherein said computation means computes a strain change $\Delta\varepsilon$ that appears in each of the plurality of small sections, and the temperature $\Delta T$ of each of the plurality of small sections, according to $$\begin{pmatrix} \Delta v \\ \dfrac{\Delta Ps}{P_{(R)}} \end{pmatrix} = \begin{pmatrix} C_{\varepsilon v} & C_{Tv} \\ C_{\varepsilon P} & C_{TP} \end{pmatrix} \begin{pmatrix} \Delta\varepsilon \\ \Delta T \end{pmatrix}$$

where $\Delta v$ is a frequency shift, $\Delta Ps$ is a power shift in the light intensity of the scattered light measured or a variation in the scattering gain coefficient computed, $P(R)$ is a light intensity of Rayleigh scattered light or the light intensity of the pulsed pump light, and $C_{\varepsilon v}$, $C_{\varepsilon p}$, $C_{Tv}$, and $C_{tp}$ are constants of said optical fiber.

8. The measurement apparatus according to claim 7, wherein the light pulses included in each series of light pulses of the pulsed probe light have a constant pulse repetition rate.

9. The measurement apparatus according to claim 7, wherein the light pulses included in each series of light pulses of the pulsed probe light are a series of pulses that do not have a constant pulse repetition rate and correspond to a code.

10. A measurement apparatus for measuring at least one of strain and temperature, of an object, said apparatus comprising:

an optical fiber secured to an object, said optical fiber having first and second ends, said optical fiber including a measurement area divided into m small equal length sections, each section having an identical length;

pulsed pump light source means for injecting pulsed pump light into the first end of said optical fiber;

pulsed probe light source means for injecting pulsed probe light into the second end of said optical fiber;

control means operatively connected to said pulsed pump light source means and said pulsed probe light source means for setting the pulsed probe light to a frequency vs and for scanning the frequency vs of the pulsed probe light over a range of frequencies;

light intensity measurement means for measuring intensity of output light emitted from the first end of said optical fiber;

filter means located in an optical path from the first end of said optical fiber to said light intensity measurement means, for selectively transmitting scattered light included in the output light; and computation means for computing a distribution of at least one of strain and temperature of the object in said measurement area in said optical fiber, said pulsed pump light source means injecting pulsed pump light with a time duration equal to n-times the length of a time period corresponding to two times the length of each of the m small sections into said optical fiber with respect to each pulse of the pulsed probe light incident on said optical fiber, under control of said control means, said pulsed probe light source means successively injecting at least two series of light pulses of the pulsed probe light, each series being obtained by dividing discontinuous light with a certain time duration into units of the time period, under control of said control means, so that each pulse collides with corresponding pulsed pump light from said pump light source means at a certain position in said optical fiber, and said computation means computing a scattered gain coefficient of scattered light associated with each of the m small sections based on the light intensity of scattered light having a frequency equal to the frequency vs of the pulsed probe light, measured by said light intensity measurement means, according to equation (5), $$\begin{pmatrix} a(1,1) & a(1,2) & \cdots & a(1,n) & 0 & \cdots & \cdots & \cdots & \cdots & 0 \\ 0 & a(2,2) & a(2,3) & \cdots & a(2,n+1) & 0 & \cdots & \cdots & \cdots & 0 \\ \vdots & & \ddots & & & & & & & \vdots \\ 0 & \cdots & \cdots & a(i,i) & a(i,i+1) & \cdots & a(i,i+n-1) & 0 & \cdots & 0 \\ \vdots & & & & \ddots & & & & & \vdots \\ 0 & \cdots & \cdots & \cdots & a(m,m) & a(m,m+1) & \cdots & \cdots & \cdots & a(m,m+n-1) \end{pmatrix} \begin{pmatrix} gs(1) \\ gs(2) \\ \vdots \\ gs(i) \\ \vdots \\ gs(m) \\ \vdots \\ gs(m+n-1) \end{pmatrix} = \begin{pmatrix} Qs(1) \\ Qs(2) \\ \vdots \\ Qs(i) \\ \vdots \\ Qs(m) \end{pmatrix} \quad (5)$$

where Qs(i) (i=1, ... m) is a variable determined by at least the light intensity of scattered light associated with i-th to (1+n-1)-th small sections numbered from one at a first end of the measurement area, and the light intensity of the pulsed probe light incident on said optical fiber, gs(i) is the scattering gain coefficient of scattered light having a frequency equal to the frequency vs, associated with the i-th small section, and a(i,j) is a contribution factor representing a ratio of the light intensity of scattered light associated with a j-th small section to Qs(i), and wherein said computation means computes a frequency shift in the scattered light associated with each of the m small sections based on scattering gain coefficients computed throughout the frequency range of the pulsed probe light, over which the frequency vs of the pulsed probe light has been scanned, to compute at least one of the strain and the temperature of each of the m small sections based on the frequency shift computed, and/or light intensities of the scattered light associated with each of the m small sections which have been obtained by scanning the frequency vs of the pulsed probe light.

11. The measurement apparatus according to claim 7, further comprising temperature measurement means for measuring temperature of a reference fiber portion associated with the scattering gain coefficients gs(m+1) to gs(M+n-1) (or gs(1) to gs(n-1)), which is a part of said optical fiber not secured to the object, wherein said computation means computes the scattering gain coefficients gs(m+1) to gs(M+n-1) based on the temperature measured and computes the scattering gain coefficient associated with each of the plurality of small sections, according to the equation (5).

12. The measurement apparatus according to claim 7, wherein said computation means computes the contribution factor a(i,j) for each of the plurality of small sections according to $$a(i,j) = \frac{Pk(0)}{A} e^{-\alpha_p z} \cdot dz$$

where, assuming that the pulsed pump light is divided into n equal parts, Pk(0) is light intensity of a k-th small pump light part Pk numbered from a first end of the pulsed pump light when the pulsed pump light is incident on the first end of said optical fiber, A is cross-sectional area of a core of said optical fiber, $\alpha_p$ is an attenuation coefficient of the pulsed pump light, z is distance from the first end of said optical fiber to a specified small section, and dz is the length of each of the plurality of small sections.

13. The measurement apparatus according to claim 7, wherein said computation means computes a strain change $\Delta\epsilon$ that appears in each of the plurality of small sections, and the temperature $\Delta T$ of each of the plurality of small sections, according to $$\begin{pmatrix} \Delta v \\ \frac{\Delta Ps}{P_{(R)}} \end{pmatrix} = \begin{pmatrix} C_{\epsilon v} & C_{Tv} \\ C_{\epsilon P} & C_{TP} \end{pmatrix} \begin{pmatrix} \Delta \epsilon \\ \Delta T \end{pmatrix}$$

where $\Delta v$ is a frequency shift, $\Delta Ps$ is a power shift in the light intensity of the scattered light measured or a variation in the scattering gain coefficient computed, P(R) is a light intensity of Rayleigh scattered light or the light intensity of the pulsed pump light, and $C_{\epsilon v}$, $C_{\epsilon p}$, $C_{t\epsilon}$, and $C_{tp}$ are constants of said optical fiber.

14. The measurement apparatus according to claim 7, wherein said optical fiber is partially secured to at least one object.

15. A measurement apparatus for measuring at least one of as strain and temperature, of an object, said apparatus comprising:

an optical fiber secured to an object, said optical fiber having first and second ends, said optical fiber including a measurement area divided into m small equal length sections, each section having an identical length;

pulsed pump light source means for injecting pulsed pump light into the first end of said optical fiber;

pulsed probe light source means for injecting pulsed probe light into the second end of said optical fiber;

control means operatively connected to said pulsed pump light source means and said pulsed probe light source means for setting the pulsed probe light to a frequency vs and for scanning the frequency vs of the pulsed probe light over a range of frequencies;

light intensity measurement means for measuring intensity of output light emitted from the first end of said optical fiber;

filter means located in an optical path from the first end of said optical fiber to said light intensity measurement means, for selectively transmitting scattered light included in the output light; and computation means for computing a distribution of at least one of strain and temperature as of the object in said measurement area in said optical fiber, said pulsed pump light source means injecting pulsed pump light with a time duration equal to n-times the length of a time period corresponding to two times the length of each of the m small sections into said optical fiber with respect to each pulse of the pulsed probe light incident on said optical fiber, under control of said control means, said pulsed probe light source means injecting either pulsed probe light with the frequency vs, comprising a series of light pulses having a pulse repetition period equal to the time period, or at least two series of light pulses of the pulsed probe light with the frequency vs, in succession, each series of light pulses being obtained by dividing the pulsed probe light, under control of said control means, so that each pulse of the pulsed probe light collides with corresponding pulses of the pump light from said pump light source means at a certain position in said optical fiber, and said computation means computing a scattered gain coefficient of scattered light associated with each of the m small sections based on the light intensity of scattered light having a frequency equal to the frequency vs of the pulsed probe light, measured by said light intensity measurement means, according to, of the measurement area, and the light intensity of the pulsed probe light incident on said optical fiber, gs(i) is the scattering gain coefficient of scattered light having a frequency equal to the frequency vs, associated with the i-th small section, and a(i,j) is a contribution factor representing a ratio of the light intensity of scattered light associated with a j-th small section to Qs(i), and wherein said computation means computes a frequency shift in the scattered light associated with each of the m small sections based on scattering gain coefficients computed throughout the frequency range of the pulsed probe light, over which the frequency vs of the pulsed probe light has been scanned, to compute at least one of the strain and the temperature of each of the m small sections based on the frequency shift computed, and/or light intensities of the scattered light associated with each of the m small sections which have been obtained by scanning the frequency vs of the pulsed probe light.

16. The measurement apparatus according to claim 15, the light pulses included in each series of light pulses of the pulsed probe light are a series of pulses that do not have a constant pulse repetition rate and correspond to a code.

17. A measurement apparatus for measuring at least one of strain and temperature of an object, said apparatus comprising:

an optical fiber secured to an object, said optical fiber having first and second ends, said optical fiber including a measurement area divided into m small equal length sections, each section having an identical length;

reflection means arranged at the second end of said optical fiber;

pulsed pump light source means for injecting pulsed pump light into the first end of said optical fiber, the pulsed pump light being reflected by said reflection means;

pulsed probe light source means for injecting pulsed probe light into the first end of said optical fiber, the pulsed probe light being reflected by said reflection means;

control means operatively connected to said pulsed pump light source means and said pulsed probe light source means for setting the pulsed probe light to a frequency vs and for scanning the frequency vs of the pulsed probe light over a range of frequencies;

$$\begin{pmatrix} a(1,1) & a(1,2) & \cdots & a(1,n) & 0 & \cdots & \cdots & \cdots & \cdots & 0 \\ 0 & a(2,2) & a(2,3) & \cdots & a(2,n+1) & 0 & \cdots & \cdots & \cdots & 0 \\ \vdots & & \ddots & & & & & & & \vdots \\ 0 & \cdots & \cdots & a(i,i) & a(i,i+1) & \cdots & a(i,i+n-1) & 0 & \cdots & 0 \\ \vdots & & & & & \ddots & & & & \vdots \\ 0 & \cdots & \cdots & \cdots & a(m,m) & a(m,m+1) & \cdots & \cdots & \cdots & a(m,m+n-1) \end{pmatrix}$$

$$\begin{pmatrix} gs(1) \\ gs(2) \\ \vdots \\ gs(i) \\ \vdots \\ gs(m) \\ \vdots \\ gs(m+n-1) \end{pmatrix} = \begin{pmatrix} Qs(1) \\ Qs(2) \\ \vdots \\ Qs(i) \\ \vdots \\ Qs(m) \end{pmatrix}$$

where Qs(i) (i=1, ... m) is a variable determined by at least the light intensity of scattered light associated with i-th to (1+n−1)-th small sections numbered from one at a first end light intensity measurement means for measuring intensity of output light emitted from the first end of said optical fiber;

filter means located in an optical path from the first end of said optical fiber to said light intensity measurement means, for selectively transmitting scattered light included in the output light; and computation means for computing a distribution of at least one of strain and temperature in said measurement area of the object in said optical fiber, said pulsed pump light source means injecting pump light with a time duration equal to n-times the length of a time period corresponding to two times the length of each of the m small sections into said optical fiber with respect to each pulse of the pulsed probe light incident on said optical fiber, under control of said control means, said pulsed probe light source means successively injecting at least two series of light pulses of the pulsed probe light, each series being obtained by dividing discontinuous light with a certain time duration into units of the time period, under control of said control means, so that each pulse collides with corresponding pulsed pump light from said pump light source means at a certain position in said optical fiber, and said computation means computing a scattered gain coefficient of scattered light associated with each of the m small sections based on the light intensity of scattered light having a frequency equal to the frequency vs of the pulsed probe light, measured by said light intensity measurement means, according to $$\begin{pmatrix} a(1,1) & a(1,2) & \cdots & a(1,n) & 0 & \cdots & \cdots & \cdots & \cdots & 0 \\ 0 & a(2,2) & a(2,3) & \cdots & a(2,n+1) & 0 & \cdots & \cdots & \cdots & 0 \\ \vdots & & \ddots & & & & & & & \vdots \\ 0 & \cdots & \cdots & a(i,i) & a(i,i+1) & \cdots & a(i,i+n-1) & 0 & \cdots & 0 \\ \vdots & & & & & \ddots & & & & \vdots \\ 0 & \cdots & \cdots & \cdots & a(m,m) & a(m,m+1) & \cdots & \cdots & \cdots & a(m,m+n-1) \end{pmatrix}$$

$$\begin{pmatrix} gs(1) \\ gs(2) \\ \vdots \\ gs(i) \\ \vdots \\ gs(m) \\ \vdots \\ gs(m+n-1) \end{pmatrix} = \begin{pmatrix} Qs(1) \\ Qs(2) \\ \vdots \\ Qs(i) \\ \vdots \\ Qs(m) \end{pmatrix}$$

where $Qs(i)$ ($i=1, \ldots m$) is a variable determined by at least the light intensity of scattered light associated with i-th to $(1+n-1)$-th small sections numbered from one at a first end of the measurement area, and the light intensity of the pulsed probe light incident on said optical fiber, $gs(i)$ is the scattering gain coefficient of scattered light having a frequency equal to the frequency vs, associated with the i-th small section, and $a(i,j)$ is a contribution factor representing a ratio of the light intensity of scattered light associated with a j-th small section to $Qs(i)$, and wherein said computation means computes a frequency shift in the scattered light associated with each of the m small sections based on scattering gain coefficients computed throughout the frequency range of the pulsed probe light, over which the frequency vs of the pulsed probe light has been scanned, to compute at least one of the strain and the temperature of each of the m small sections based on the frequency shift computed, and/or light intensities of the scattered light associated with each of the m small sections which have been obtained by scanning the frequency vs of the pulsed probe light.

\* \* \* \* \*